US008713393B2

(12) United States Patent
Heise et al.

(10) Patent No.: US 8,713,393 B2
(45) Date of Patent: Apr. 29, 2014

(54) RETRANSMISSION AND RETRANSMISSION REQUEST IN DATA COMMUNICATION SYSTEMS

(75) Inventors: Bernd Heise, Munich (DE); Michael Horvat, Munich (DE); Chunfeng Hu, Singapore (SG); Juraj Povazanec, Singapore (SG); Gert Schedelbeck, Munich (DE); Dietmar Schoppmeier, Unterhaching (DE); Ingo Volkening, Singapore (SG)

(73) Assignee: Lantiq Deutschland GmbH, Neubiberg (DE)

( * ) Notice: Subject to any disclaimer, the term of this patent is extended or adjusted under 35 U.S.C. 154(b) by 1056 days.

(21) Appl. No.: 12/209,212

(22) Filed: Sep. 12, 2008

(65) Prior Publication Data

US 2009/0089638 A1 Apr. 2, 2009

Related U.S. Application Data

(60) Provisional application No. 60/976,839, filed on Oct. 2, 2007, provisional application No. 60/984,132, filed on Oct. 31, 2007, provisional application No. 60/991,812, filed on Dec. 3, 2007.

(51) Int. Cl.
*G06F 11/00* (2006.01)

(52) U.S. Cl.
USPC .......................................... 714/748

(58) Field of Classification Search
USPC .......................................... 714/748
See application file for complete search history.

(56) References Cited

U.S. PATENT DOCUMENTS

| 5,477,550 | A | 12/1995 | Crisler et al. | |
|---|---|---|---|---|
| 6,560,206 | B1 * | 5/2003 | Naden et al. | 370/310.1 |
| 6,609,224 | B1 * | 8/2003 | Jonsson | 714/758 |
| 6,931,569 | B2 * | 8/2005 | Fong et al. | 714/18 |
| 7,054,316 | B2 * | 5/2006 | Cheng et al. | 370/394 |
| 7,058,027 | B1 * | 6/2006 | Alessi et al. | 370/310.1 |
| 2002/0142730 | A1 * | 10/2002 | Hsu | 455/72 |
| 2003/0198250 | A1 * | 10/2003 | Hakenberg et al. | 370/457 |
| 2004/0037234 | A1 * | 2/2004 | Strawczynski et al. | 370/252 |
| 2004/0165542 | A1 * | 8/2004 | Ido et al. | 370/252 |
| 2004/0179556 | A1 * | 9/2004 | Kobayashi et al. | 370/535 |
| 2005/0152404 | A1 * | 7/2005 | Holmquist et al. | 370/485 |
| 2005/0232193 | A1 * | 10/2005 | Jorgensen | 370/329 |
| 2008/0063007 | A1 * | 3/2008 | Christiaens et al. | 370/458 |
| 2008/0089314 | A1 * | 4/2008 | Meyer et al. | 370/349 |
| 2008/0123655 | A1 * | 5/2008 | Kim et al. | 370/394 |
| 2008/0212566 | A1 * | 9/2008 | Kim et al. | 370/352 |
| 2009/0034526 | A1 * | 2/2009 | Ahmadi et al. | 370/392 |
| 2009/0086759 | A1 * | 4/2009 | Heise et al. | 370/474 |

FOREIGN PATENT DOCUMENTS

| CN | 1390017 A | 1/2003 |
|---|---|---|
| WO | 2004/015906 A2 | 2/2004 |
| WO | 2005/076688 A2 | 8/2005 |

OTHER PUBLICATIONS

Dictionary definition (wikipedia) for OSI model. Retrieved from http://en.wikipedia.org/wiki/OSI_model on May 6, 2013.*
"G.inp: Performance of Retransmission layer at the gamma interface;RJ-054", ITU-T Drafts; Study Period 2005-2008, International Telecommunication Union, Geneva, CH, vol. Study Group 15 ; 4/15, Apr. 8, 2007, pp. 1-11.

* cited by examiner

*Primary Examiner* — Yair Leibovich
(74) *Attorney, Agent, or Firm* — SpryIP, LLC

(57) ABSTRACT

Embodiments related to retransmission and a retransmission request are described and depicted.

32 Claims, 18 Drawing Sheets

*Fig. 5a*

| GFC | VPI (Bits 7:0) | VCI (Bits 15:0) | PTI | CLP | HEC (Bits 7:0) |

A) Standard ATM Cell Header

*Fig. 5b*

| SID (Bits 11:8) | VPI (Bits 7:0) | SID (Bits 7:0) | VCI (Bits 7:0) | PTI | Flag | HEC (Bits 7:0) |

Flag: 0 First time transmitted;
Retransmitted

B) Modified ATM Cell Header for Retransmission and bonding with 12 bit Sequence ID

*Fig. 5c*

| GFC | VPI (Bits 7:0) | SID (Bits 7:0) | VCI (Bits 7:0) | PTI | Flag | HEC (Bits 7:0) |

Flag: 0 First time transmitted;
Retransmitted

C) Modified ATM Cell Header for Retransmission and bonding with 8 bit Sequence ID

*Fig. 5d*

| SID[11:8] | VPI[7:0] | SID[7:0] | VCI[7:0] | PTI[2:0] | CLP |

Standardized first 4 bytes of ATM Cell Header with 12-bit bonding SID

*Fig. 5e*

| SID[11:8] | SID[7:0] | Unused Bits | cVPIVCI[3:0] | PTI[2:0] | CLP |

Standardized first 4 bytes of ATM Cell Header with 12-bit bonding SID after shift of SID[7:0] and after compression of VPI/VCI to cVPIVCI

RETRANSMISSION AND RETRANSMISSION REQUEST IN DATA COMMUNICATION SYSTEMS

REFERENCE TO RELATED APPLICATIONS

This application claims the benefit of the priority date of U.S. provisional application 60/976,839 filed on Oct. 2, 2007, U.S. provisional application 60/984,132 filed on Oct. 31, 2007, and U.S. provisional 60/991,812 filed on Dec. 3, 2007, the contents of which are herein incorporated by reference.

BACKGROUND

Modern data communication systems such as DSL communication systems transmit a plurality of different data types. Data of high-quality services such as IPTV services or video services require an efficient noise protection since missing data often provide strong disturbances of these services. Present impulse noise protection with Reed Solomon coding and interleaving provide not sufficient protection for these high-quality services.

Retransmission schemes have been introduced to address noise protection for high-quality services. In retransmission, data transmitted over a communication link such as a subscriber line is stored at the transmitter site for some time. In case the receiver site receives corrupt data, for example when an impulse noise occurs, the transmitter site retransmits the data based on a request from the receiver to again over the communication link.

BRIEF DESCRIPTION OF THE SEVERAL VIEWS OF THE DRAWINGS

FIG. 5a to e shows exemplary cell headers;

DETAILED DESCRIPTION

The following detailed description explains exemplary embodiments of the present invention. The description is not to be taken in a limiting sense, but is made only for the purpose of illustrating the general principles of embodiments of the invention while the scope of protection is only determined by the appended claims.

In the various figures, identical or similar entities, modules, devices etc. may have assigned the same reference number.

In the following various embodiments of a retransmisison system are described. The embodiments are described with respect to a DSL system such as a ADSL or VDSL system. However, it is to be understood that the various embodiments may also be implemented in other data communication systems for providing retransmission.

Figure 1:
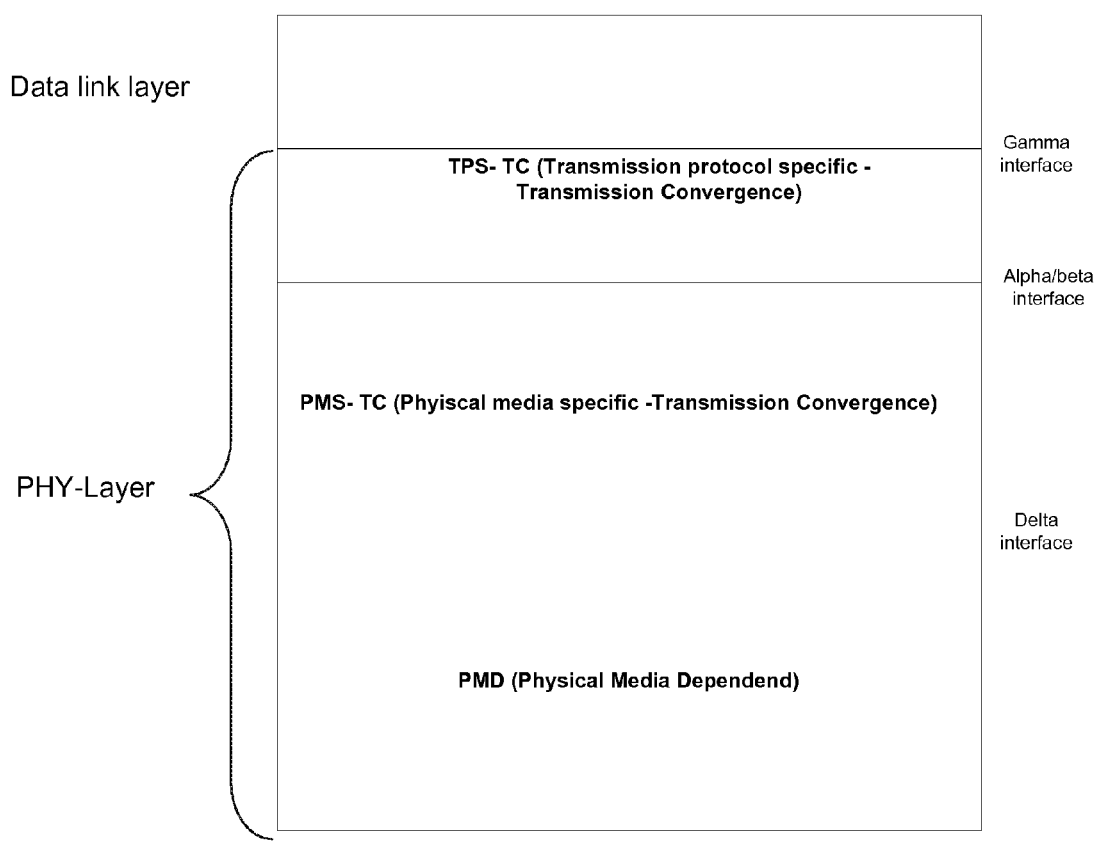
FIG. 1 shows a schematic block diagram of a communication layer model.

For better understanding, in the following an exemplary protocol stack of a present VDSL or ADSL system is explained with respect to FIG. 1. FIG. 1 shows the lowest two layers in the OSI model, i.e. the PHY and the data link layer. According to FIG. 1, the PHY layer (first layer in the OSI model) is divided into three sublayers. The first sublayer is the PMD (physical media dependant) layer including basic functionality such as symbol timing generation and recovery, encoding and decoding, modulation and demodulation, echo cancellation (if implemented) and line equalization, link startup, and physical layer overhead (superframing). Additionally, the PMD layer may generate or receive control messages via an overhead channel.

The next sublayer in the PHY layer is the PMS-TC (physical media specific-transmission convergence) layer which is connected to the PMD layer through the δ interface. The PMS-TC layer is a management plane and provides management primitive indications to management entities in the CO and CPE modems. The PMS-TC layer provides in addition functionality such as generation of frames and synchronization of frames, (de)scrambling, Reed-Solomon coding and interleaving. The third sublayer in the PHY layer is the TPS-TC (transmission protocol specific-transmission convergence) which is connected to the PMS-TC layer through a α-interface (alpha-interface) at the Central Office Site or a β-interface (beta-interface) at the subscriber site. The TPS-TC layer provides functionality such as packetizing into frames, organizing of the bearer channels, multiplexing. The TPS-TC layer is connected to the data link layer (layer 2 in the OSI model) by the γ-interface (gamma-interface).

While the above described existing DSL layer model does not provide a retransmission functionality or retransmission layer, embodiments of the present invention address the provision of a retransmission functionality or retransmission layer for a DSL transmission system. According to one aspect, a retransmission functionality is provided for a DSL transmission system on the basis of using a cell or a group of cells as basic retransmission data units. This means that single or multiple cells are retransmitted. Thus, in embodiments, the basic retransmission unit is a cell. In other embodiments, the basic retransmission unit is a group of cells. Therefore, in embodiments, a cell or a group of cells are stored in a retransmission buffer to allow retransmission of cells or group of cells.

A group of cells may for example be a block of multiple cells which is herein referred to as a macro cell or a super-cell. According to embodiments, the cell header includes the cell identification for example a sequence ID, thus allowing for a unique identification of the retransmission unit.

Each cell or each group of cells may contain first information indicating whether the cell or group of cells contains retransmitted data or does not contain retransmitted data. Furthermore, each cell or each group of cells may contain second information related to a retransmission indication, for example information indicating how many times the retransmitted data has been transmitted prior to the current retransmission. For example, the retransmission indication may indicate that the retransmission data are retransmitted for the first time, the second time or a nth time. According to one embodiment, the first and second information may be provided in each cell without changing the size of the cells by using a ATM header compression technique. By using the ATM header compression technique, information space (bits) becomes available in the ATM header for providing the first and second information. According to one embodiment, the ATM header compression technique is a VPI/VCI compression wherein the information contained in the VPI field and VCI field is mapped to information contained in a common VPIVCI field having a length smaller than the sum of the VPI and VCI field. The mapping may for example be provided by using a look up table.

According to embodiments, the retransmission is based on a sequence number information of the last correctly received cell.

According to embodiments, the sequence number information is included in a retransmission request generated and transmitted to the transmitter when the receiver detects a corrupt received cell, for example due to the start of a noise impulse. The retransmission request may be repeated as long as no retransmission data has been received by the receiver.

The transmitter may upon receiving the retransmission request wait for a predefined or predetermined time period before starting to retransmission.

For providing sequence number information for the cells containing user data, the SID (sequence identifier) information provided by a bonding layer above the retransmission layer may be used as sequence number information. A rate decoupling may be provided wherein one or more idle cells are inserted when no user data is currently available for transmission. The insertion and removing of the idle cells and provision of the sequence number information for the idle cells may be provided by a retransmission layer between the TPS-TC sublayer and a bonding layer. The idle cells may be of a category such that the idle cells are not identified as idle cells at the TPS-TC sublayer (i.e. are not removed at the receiver's TPS-TC sublayer). Idle cells belonging to this category will be referred in the following as special idle cells. Thus, at the receiver, the special idle cells are transparently transferred from the TPS-TC sublayer to the retransmission sublayer allowing the identification of the sequence number information at the retransmission sublayer. The special idle cells are then removed at the retransmission layer.

According to one embodiment, the special idle cells are used for training or determining one or more repetitive noise parameters such as REIN (repetitive electrical impulse noise) parameters. The one or more repetitive noise parameters may then be used to determine time periods during which repetitive noise is expected. During the determined time periods of repetitive noise, no user data may be transmitted. According to one embodiment, instead of user data the special idle cells are transmitted during the determined time periods.

To determine the repetitive noise parameters, a plurality of special idle cells are repeatedly transmitted from the transmitter to the receiver, wherein each of the special idle cells comprises a sequence number. One or more sequence numbers of corrupted special idle cells are identified at the receiver and one or more repetitive noise parameters based on the identified sequence numbers are determined. According to one embodiment, information related to a start and end of a repetitive impulse is transmitted from the receiver to the transmitter and the repetitive noise parameters are determined based on the transmitted information.

The repetitive noise parameters determined may be periodicity and length of the repetitive noise. The above determining of repetitive noise parameters may be performed once after link startup or may be repeatedly performed during showtime.

According to embodiments, the retransmission request is transmitted on a retransmission request channel realized by using free bits obtained by ATM header compression, for example VPI/VCI header compression. The retransmission request channel may be continuously provided by using rate decoupling.

The retransmission functionality may be provided by a retransmission sublayer or layer above at least one sublayer of the TPS-TC layer.

According to embodiments, the retransmission sublayer may be located above the rate decoupling TPS-TC sublayer and below the data link layer. Furthermore, according to embodiments, the retransmission sublayer may be provided above the TPS-TC layer and below the data link layer. Distinguished from packets, cells are data units having a fixed length as is known to a person skilled in the art. According to embodiments of the present invention, the DSL system addresses ATM as transport protocol. In this case, the cells are ATM (asynchronous transfer mode) cells with a length of 53 bytes.

Retransmission above the TPS-TC layer or above at least one sublayer (entity) of the TPS-TC layer (for example above the rate decoupling sublayer/entity) allows according to one embodiment to make reuse of existing bonding sublayer functionality in case of bonding and non-bonding applications. For example, the sequence ID (SID) provided in the cell header or the macro cell header for ATM bonding systems may be used to providing identification of the cells or macro cells to be transmitted.

Furthermore, retransmission schemes above the TPS-TC layer or above at least one TPS-TC sublayer such as the rate decoupling layer avoids problems occurring in implementations of retransmission schemes below the TPS-TC layer. For example retransmission below the TPS-TC layer is based on a continuous data stream since TPS-TC sublayer applies rate decoupling. If data is missing from the upper sublayer, idle cells are inserted in case an ATM transport protocol is used. This means that retransmission below the TPS-TC layer will be done also for idle data carrying no information. In case of retransmission above TPS-TC layer or above at least one sublayer of the TPS-TC layer the useless retransmission of rate decoupling data can be avoided.

Furthermore, retransmission schemes below the TPS-TC layer may have a negative effect on the bonding sublayer since retransmission of one line in the bonding group increases the differential delay for the bonding sublayer. Line specific retransmissions lead to a differential delay variation for the bonding sublayer and it is not known by the bonding sublayer when it has to tolerate which differential delay due to retransmission. If the retransmission sublayer is placed above the TPS-TC layer or at least one sublayer of the TPS-TC layer, bonding & retransmission functionality can be combined in a same sublayer so that this problem can be overcome.

Retransmission above the TPS-TC layer or above the rate decoupling entity can realize service specific retransmission also with one latency path, bearer channel. The service specific retransmission has the advantage that a retransmission overhead (e.g. sequence numbering) has to be taken into account only for the service which shall be protected, not for the other services and that no retransmissions of low prio services take line bandwidth. Cells which do not require retransmission protection can be directly passed to the next layer/sublayer or functionality within a layer/sublayer immediately without processing in the retransmission layer. Such cells include for example ATM cells for the latency sensitive PVC (permanent virtual circuit) service.

Additionally, the bandwidth of a non-retransmission service with variable bit rate (e.g. data service) may be used during retransmission. This may reduce or even obsolete the need to forsee an overhead in the bandwidth of the retransmission service.

A retransmission scheme above the TPS-TC layer or at least one TPS-TC sublayer can be implemented in a PHY connected network processor which gives the advantage that usually the buffer limits are more relaxed than a PHY memory. Additionally the network processor has an advantage for a service specific retransmission scheme since service classification is also done there.

Furthermore, according to one aspect of embodiments, existing bonding sublayer functionality is reused also for the retransmission sublayer.

Furthermore, the retransmission protection can be combined with other impulse noise techniques for example FEC techniques with interleaving and erasure decoding to achieve a noise protection with synergetic effects and high system performance.

Furthermore, retransmission with one or more cells as basic retransmission units allows efficient retransmission since typically several corrupted bytes cause up to five or six ATM cells to be retransmitted.

According to one aspect, the retransmission is based on the receiving of a retransmission request from the remote site.

Figure 2:
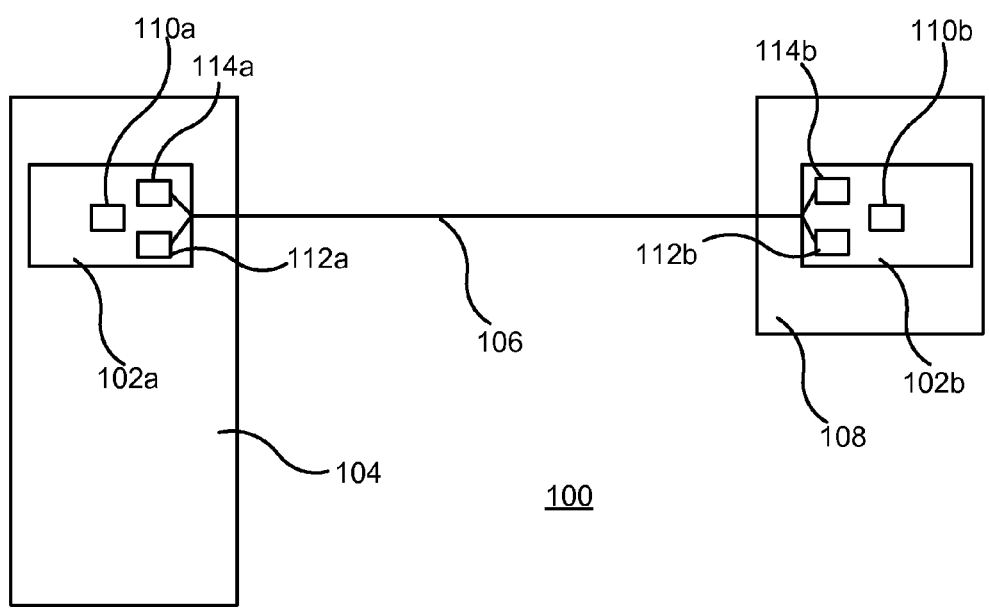
FIG. 2 shows a schematic diagram according to an embodiment of the present invention.

Referring now to FIG. 2, an exemplary DSL communication system is described. As is known to a person skilled in the art, the DSL system 100 may be a DMT (discrete multitone) system wherein data are modulated on a plurality of subcarriers such that each subcarrier is associated with one carrier frequency. The DSL system comprises a first transceiver unit 102a provided at the operators site in an unit 104 such as a central office, a cabinet or other optical network termination units. The first transceiver unit 102a is coupled to a second transceiver unit 102b via a subscriber line 106. The second transceiver unit 102b is integrated in a unit 108 at the subscriber site for example a costumer premise equipment (CPE) such as a modem, router or any other gateway which may also be integrated in other devices such as a personal computer or notebook.

The first transceiver unit 102a includes a first transmitter 112a and a first receiver 114a coupled to the subscriber line 106. The second transceiver unit 102b includes a second transmitter 112b and a second receiver 114b coupled to the subscriber line 106. For coupling of the transmitters and receivers each of the transceiver units may comprise a coupling interface such as hybrid networks etc.

A first controller 110a may be provided to provide controlling and coordination functions for transceiver unit 102a. Furthermore, a second controller 110b may be provided at the subscriber site provide controlling and coordination functions for transceiver unit 102a.

While FIG. 2 shows the controllers 110a and 110b integrated with a respective one of transceiver units 102a and 102b, it is to be understood that the controllers 110a and 110b may be provided separate from the respective transceiver unit. It is further to be understood that components and entities shown may be implemented in hardware, software, firmware or any combinations thereof.

Furthermore, while FIG. 2 shows only one subscriber line to a remote subscriber, it is to be understood that more than one transceiver unit 102a may be implemented in unit 104.

Furthermore, as will be described in more detail below, two or more subscriber lines may be bonded to provide higher data rate to a subscriber.

Figure 3:
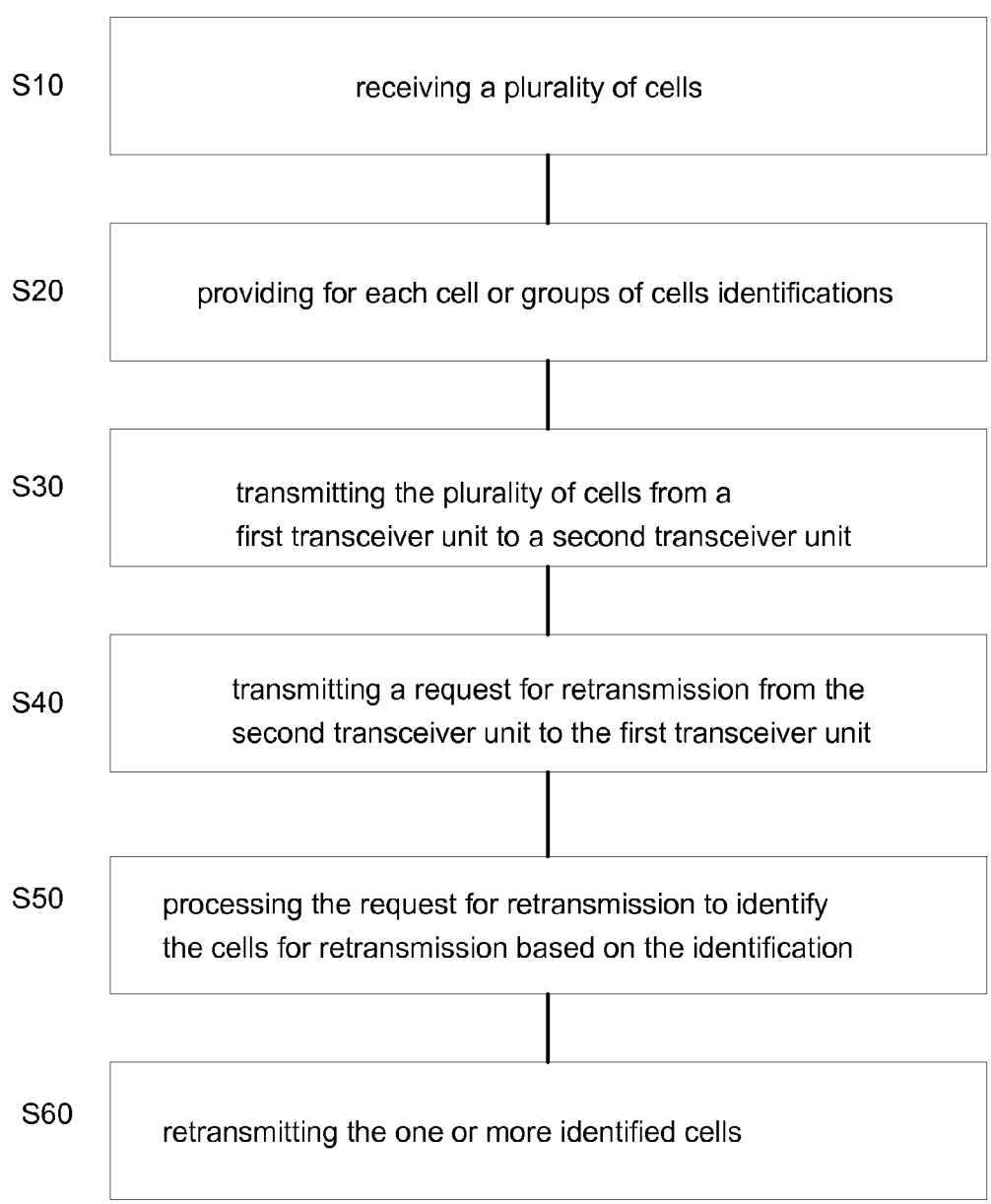
FIG. 3 shows a chart diagram according to an embodiment of the present invention.

Referring now to FIG. 3, an exemplary operation for providing retransmission is shown. At S10, a plurality of cells is received. At S20, identifications are provided for each cell or if the basic retransmission unit is a group of cells, for each group of cells. The plurality of cells are then transmitted from a first transceiver unit to a second transceiver unit at S30. At S40, a request for retransmission is transmitted from the second transceiver unit to the first transceiver unit, wherein the request comprising one or more identifications to indicate a retransmission request for one or more cells. At S50, the request for retransmission is processed at the first transceiver unit to identify the cells for retransmission based on the identification. Finally at S60, the one or more identified cells are retransmitted.

Furthermore, according to embodiments, distributing of the cells to a plurality of subscriber lines based on the cell or macro cell identification may be provided for implementing bonding functionalities. It is to be noted that a synergetic effect is provided here by the use of the cell or macro cell identification for identifying the cells/macrocells in bonding as well as in retransmission. Furthermore, other functionalities may be shared between bonding and retransmission entities. The length of the macro cell may be variable and may for example be determined during initialisation or dynamically during normal operation.

According to embodiments, a service specific retransmission may be provided by multiplexing a first data stream associated with at least a first service type, a second data stream associated with at least a second service type and a third data stream associated with retransmission data. Embodiments related to the service specific retransmission will be described in more detail below.

Furthermore, a FEC (Forward error correction) processing, a HEC (header error correction) processing, a CRC (cyclic redundancy check) processing or a combination of a FEC, HEC and CRC error correction processing may be used to provide indication of corrupt cells or corrupt macro cells. FEC processing may include for example detecting through a Reed-Solomon decoder and Erasure decoder.

In the following, specific features of retransmission embodiments related to the retransmission data unit, error detection, the retransmission request channel, service specific retransmission and the classification of the retransmission within the layer model are described. It is to be understood that one or more or the specific features may be implemented in a DSL system or a DSL transceiver. The various features described below may be combined to provide various embodiments. Furthermore, the various features described below may be combined with other features to provide various embodiments.

Retransmission Data Unit

In case of ATM as transmission protocol, the TPS-TC data unit comprises always 53 bytes and in case of bonding, a sequence number SID (12-bit or 8-bit) is mapped into the cells. This data unit, a cell with sequence number, can be used as retransmission data unit. The sequence numbering is also provided for non-bonding application to allow the identification of the retransmission data.

The ATM cell header includes the sequence ID. It may also include a flag bit indicating "first time transmitted" or "retransmitted".

As will be explained below in more detail, the ATM cell's integrity at the receiver may be verified through RS code word's FEC and Erasure Decoder (if erasure decoding is supported). If a RS code word's FEC and Erasure Decoder indicates that the current RS codeword is uncorrectable and bad, then all ATM cells which carry at least one byte from this error RS-codeword are flagged as bad ATM cells. In addition, ATM cells with wrong HEC may be regarded also as bad cells. The criteria for determining bad RS code words may be only receiver-specific and it may be provided configurable.

Furthermore, ATM cells which belong to latency sensitive PVC are passed to the next layer immediately after they are received the first time. They don't require retransmission and wait for retransmission.

Figure 4:
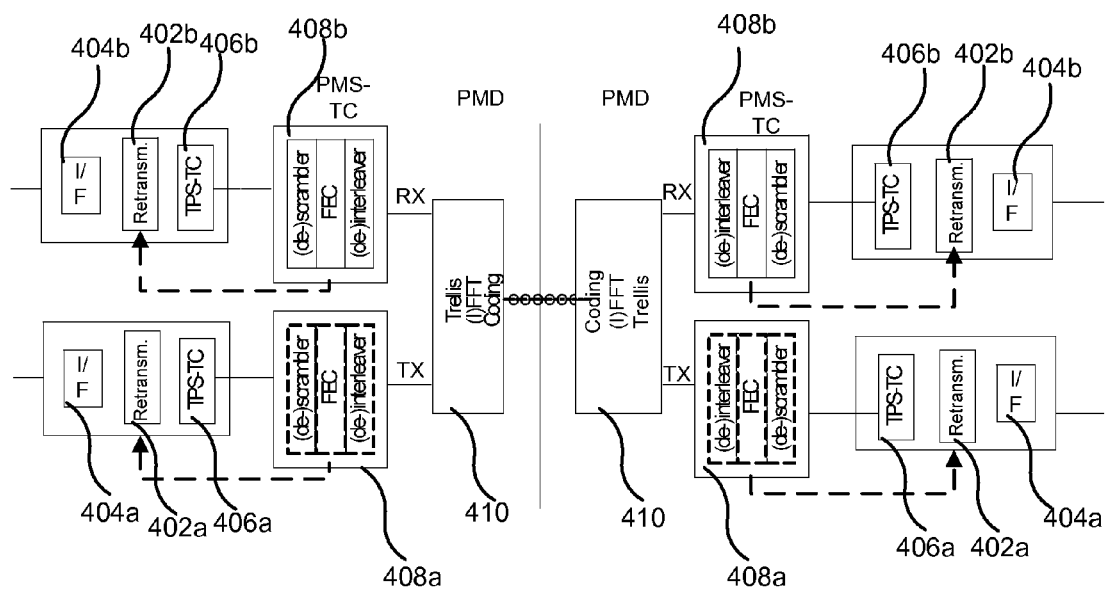
FIG. 4 shows a functional representation according to an embodiment of the present invention

Referring now to FIG. 4, a functional representation of one embodiment implementing retransmission with cells as basic retransmission units is shown.

FIG. 4 shows a functional representation for 2 transceiver units which are coupled by a subscriber line. Each of the receivers comprises a receive path and a transmit path. In the transmit path of each transceiver unit, a retransmission entity 402a is arranged between the TPS-TC entity 406a and an interface 404a to a higher layer (data link layer). The TPS-TC entity is coupled to a PMS-TC layer implementing for example scrambling, FEC and interleaver functionalities. The TPS-TC entity is coupled to a PMD entity 410 implementing functions such as trellis and (I) FFT processing. In the receive path, the same functional sequence in reversed order is provided. It is to be noted that entities 402a, 404a, 406a and 408a are replaced by entities 402b, 404b, 406b and 408b and may comprise the complement functionalities.

Figure 4A:
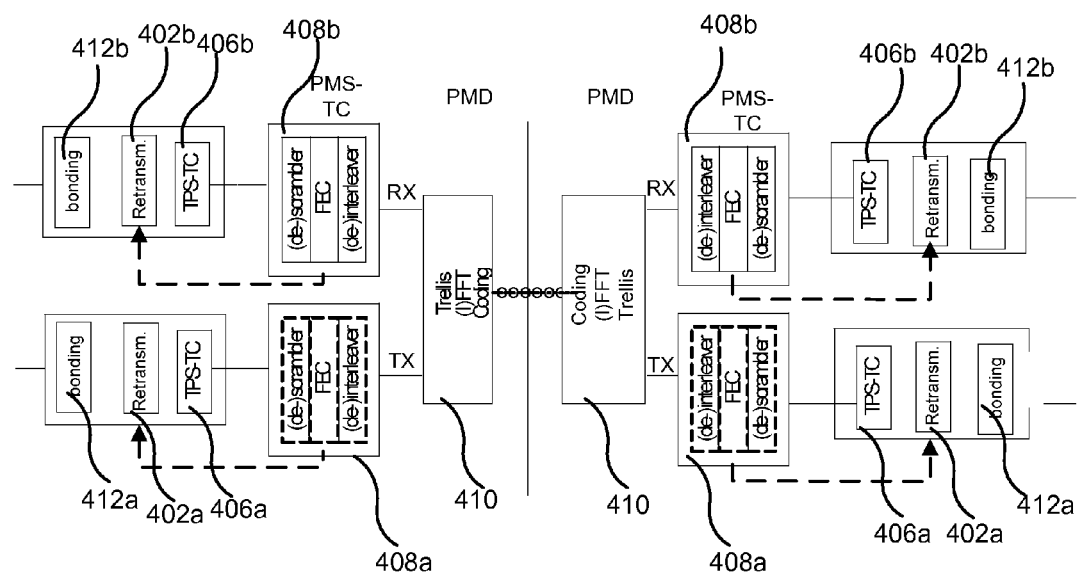
FIG. 4a shows a functional representation according to an embodiment of the present invention.

FIG. 4a shows a functional representation similar to FIG. 4a wherein the retransmission entities 402a, 402b and a bonding entities 412a, 412b are separated. Thus, according to this embodiment, the retransmission entities are provided between the TPS-TC entities and the bonding entities 412a, 412b.

Embodiments of an ATM header provided to implement the retransmission and bonding functionality are shown in FIGS. 5b and 5c. FIG. 5a shows a known example of an ATM cell header.

As can be seen from FIGS. 5b and 5c, the VCI (Virtual Channel Identifier field) provided in the known ATM header is split to use in FIGS. 5b and 5c a first part for providing VCI information in compressed form and to use a second part for providing SID (Sequence ID) information. Furthermore, in FIG. 5b, the GFC field is used for providing additional SID information such that the SID information length is extended, for example to 12 bit. Furthermore, it can be noted that the CLP (cell loss priority) field of the known header may be used in the embodiments to provide the flag bit indicating first transmission or retransmission.

FIG. 5d shows the first part of the standard ATM header as shown in FIG. 5a. FIG. 5e shows a modification of this part of the header according to one embodiment wherein a header compression is used to provide a compressed header field cVPIVCI having a length of 4 bits. A new field labeled "unused bits" is created wherein information such as a check sum of the whole cell, indication whether a retransmission data is transmitted (retransmission flag) and information indicating the number of retransmission data repetitions may be provided. The header shown in FIG. 5e may be provided for upstream and downstream transmission. In downstream direction, the "unused bits" field may be provided for realizing the retransmission request channel. In this case, the "unused bit" field may contain the sequence identification number of the last correctly received cell.

In another embodiment, retransmission data units different than 53 bytes are provided by building of macro cell structures, i.e. x cells are building a macro cell structure with x as integer configuration parameter. In other words, in these embodiments, the macro cell is the basic retransmission unit.

Figure 6:
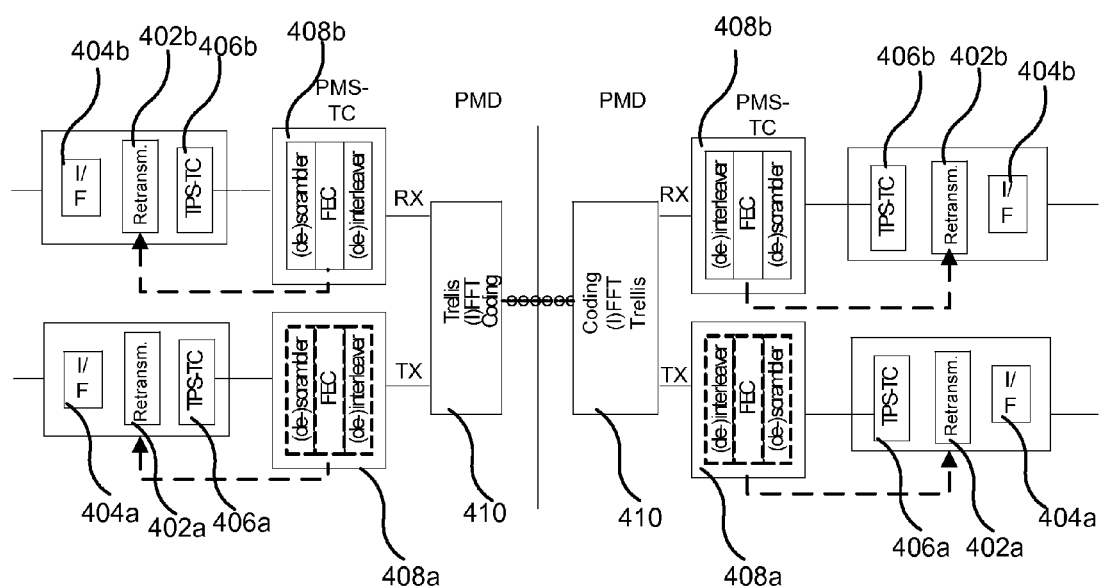
FIG. 6 shows a functional representation according to an embodiment of the present invention.

A functional representation of one embodiment implementing retransmission with macro cells as basic retransmission units is shown in FIG. 6.

The representation is basically similar to the functional representation already described with respect to FIG. 4 and reference is made thereto. However, since the basic retransmission unit is a macro cell, processing in the retransmission entities and other entities has to be adapted for the macro cell. More details of a protocol stack will be described below.

In all the functional representations, ATM cells which belong to latency sensitive services such as a PVC service may be passed to the next layer immediately after they are received in order to avoid waiting for retransmission processing.

To provide identification of the cells in case a retransmission is needed, one ATM cell header or several of the ATM cell header may include the sequence ID. It may also include a flag bit indicating "first time transmitted" or "retransmitted".

One (or several) of the ATM cell header may include CRC information. The CRC information covers all ATM payload bytes in the macro cell. It is used to verify the integrity of the macro cell. If CRC indicates that the current macro cell is wrong or at least one ATM cell header's HEC is wrong, then the whole Macro ATM cell may be regarded as bad or corrupt.

Figure 7:
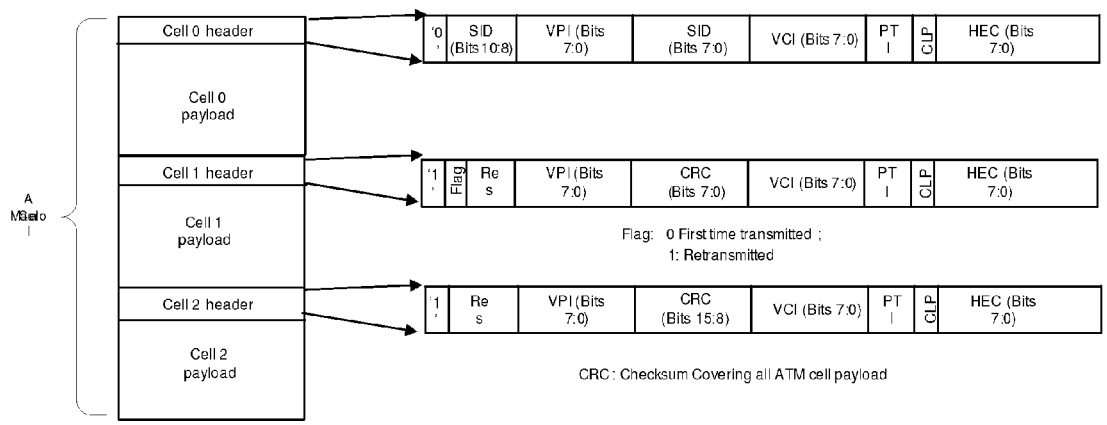
FIG. 7 shows an exemplary macro cell.

FIG. 7 shows an exemplary macro cell comprising three ATM cells. A first cell 0 comprises a header wherein the identification. i.e. the SID for all cells is included as described with respect to FIG. 5b. The second cell 1 includes the flag for indicating first or second transmission. Furthermore, the second cell 1 comprises in a part of the known VCI field CRC information. In addition, the third cell of the macro cell also comprises CRC information.

In case bonding of communication links (subscriber lines) is implemented, the macro cell building (macro cell generating) can be provided according to one embodiment above the bonding distribution function. This has the advantage that one SID per macro cell is needed instead of one per cell so that there are free fields in a macro cell which can be used for other purpose, e.g. EndOfMacro-cell indication as it is done in similar way in ATM AAL5.

According to another embodiment, the macro cell building is provided in the protocol model below the bonding distribution function.

Furthermore, many modifications of the above shown examples are encompassed. For example, according to one embodiment, the first cell of a macro cell may contain the complete SID (Sequence ID) and the other cells of a macro cell contain only a deltaSID which is the difference to the previous SID. In this way less bits are consumed than for a full SID.

According to one embodiment, the macro cell size configuration can be extended to a non-static configuration and the size can be dynamically adapted dependent on the current noise scenarios. This requires impulse noise measuring at the far-end and transferring of this information to the retransmission & bonding sublayer of the transmitter.

Error Detection

In the following, embodiments of error detection for cell and macro cell retransmission systems are described As is known to a person skilled in the art, existing ATM TC sublayers offer the functionality of CRC-8 protection. This protection is related only to the 5-byte cell header and not to the complete cell. Therefore, other functionalities are provided according to embodiments which may be combined with the CRC-8 protection to provide a detection of corrupt cells or macro cells for retransmission.

Figure 8:
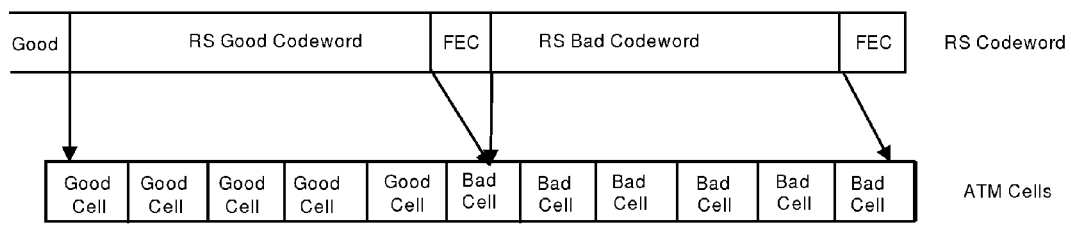
FIG. 8 shows an error detection according to one embodiment.
Figure 9:
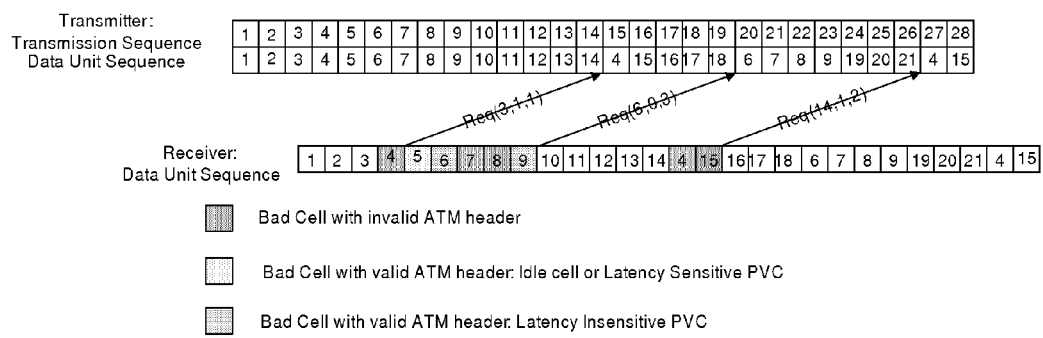
FIG. 9 shows an exemplary retransmission request.

According to one embodiment, the receiver can detect the noise situation from the FEC evaluation immediately and start a retransmission request immediately for all data units that are expected during the time of disturbance. Here the receiver can notify the transmitter about the situation by indicating which data unit (cell or macro cell) was the last correctly received and how long the stream of bit errors continued after that. It is up to the transmitter to decide whether and which data units need to be retransmitted based on this information. An exemplary error detection on the basis of a Reed-Solomon code word is shown in FIG. 8. Here, a ATM cell integrity is verified by the RS code word's FEC and Erasure. In addition, ATM cells with wrong HEC may be regarded also as corrupt cells. Corrupted ATM cells can be identified which can not be identified by decoders due to the descrambler effect.

According to another embodiment, in case of retransmission (to be negotiated between far-end and near-end during handshake) the 5th cell header byte may contain a CRC-8 over the complete cell instead of CRC over the header.

Another embodiment is directed to a mapping of the info of received errored FEC frames into an ATM cell bit so that this can be evaluated by a retransmission sublayer receiver.

A further embodiment may apply an ATM header compression scheme which uses compressed header information but without reduction of header bytes so that free bits are available for mapping a CRC over the complete cell in it.

In case of non-bonded links and if the link is error-free, the receiver sees for a current received data unit that this SID is the SID+1 of the last received data unit.

If a noise impulse occurs the receiver can detect after the end of noise impulse that SIDs are missing since then SID-current is not equal SIDlast+1.

In case of bonded links, the incrementing by one can be supervised by the receiver only after the reordering process which may cause a retransmission request delay in dependence of the link differential delay. In this case, in an embodiment, the retransmission sublayer at the transmitter stores the information which SID has been distributed to which link of the group and if the retransmission sublayer at the receiver transfers in case of errors the information about link number, current received SID and last valid received SID on the corresponding link before the error so that then the retransmission sublayer transmitter has the knowledge of what is to be retransmitted.

If the retransmission sublayer at the receiver gets an errored data unit as described above, it may discard this data unit and then has information that the link is not error-free anymore.

In case a bad ATM cell with valid ATM cell header is an idle cell, then this bad ATM cell does not require retransmission. If a bad ATM cell with valid ATM cell header belongs to the latency sensitive services such as PVC services (e.g. Voice), the corrupt ATM cell may not request retransmission according to one embodiment.

According to an embodiment, the cells matching the following rules are passed to the next layer right after they are received.

With valid ATM cell header
&
And belongs to latency sensitive PVC
&
And It is "first time transmitted"

The cells matching the following rules are discarded when they are received.

With valid ATM cell header
&
And belongs to latency sensitive PVC
&
And it is "retransmitted"

The cells matching the following rules are discarded when they are received:

With valid ATM Idle cell header
OR
Invalid ATM cell header
OR
Valid ATM cell header, but its Sequence ID is not within the current receiving window.

If the error is equal or longer than seven cells so that 7 HEC fields are corrupt the TPS-TC receiver goes out-of-sync and will not forward any data via gamma interface until it is again in sync (see section K.2.8.4 of ITU-T G.992.3) with the effect that the sublayer above the TPS-TC receiver does not receive cells anymore. According to one embodiment, the retransmission sublayer of the receiver monitors the TPS-TC receiver regarding the sync state, i.e. supervision by control plane.

According to another embodiment, the TPS-TC receiver generates an OAM cell (Operation-Administration-and-Maintenance cell which is a special ASM cell) containing the information about a state transition from sync to out-of-sync which can be received by the retransmission sublayer receiver.

According to embodiments of retransmission with macro cells, the macro cell building can be applied and free bit fields can be used for a CRC over the complete macro cell as already described with respect to FIG. 7.

In the case of a macro cell, one or several of the ATM cell header include CRC. The CRC covers all ATM payload bytes in the Macro Cell. It is used to verify the integrity of the Macro cell. If CRC indicates that the current Macro Cell is wrong or at least one ATM cell header's HEC is wrong, then the whole Macro ATM cell is bad.

Similar to the above, if all cells in a bad Macro cell belongs to latency sensitive services such as PVC services or are idle cells, then the whole Macro cell does not request for retransmission.

If a bad ATM cell (for example when Macro ATM cell's CRC incorrect) with valid ATM cell header belongs to the latency sensitive PVC, then this bad ATM cell will not wait for retransmission as described above.

Retransmission Request Channel

According to one embodiment, the transmitter maintains both data unit sequence ID and transmission sequence ID. The receiver maintains data unit sequence and receiving sequence offset to the latest data unit with correct data unit sequence.

The retransmission request may include in an embodiment the following field:

Reference Data Unit Sequence ID: this is the data unit sequence ID from the latest received data unit with valid header Start receiving offset: this is the receiving offset number from the data unit with reference data unit sequence ID. From this offset (including), the data unit should be retransmitted;

End receiving offset: this is the receiving offset number from the data unit with reference data unit sequence ID. To this offset (including), the data unit should be retransmitted One example of retransmission using the above retransmission request format is shown in FIG. 8.

According to embodiments, a dedicated latency path and bearer channel may be used. This provides of an optimized transfer format. It can be defined such that a retransmission request consumes only a few bytes, e.g. 6 bytes. Then the retransmission request sublayer should transfer retransmission requests directly to the PMS-TC sublayer. On the other hand, such dedicated channel (e.g. 64 kbit/s or 128 kbit/s) always occupies line bandwidth, also if no retransmissions takes place.

According to other embodiments, a TPS-TC OAM channel may be used. If the OAM channel is used, the full line rate (a much more higher bandwidth as 64 kbit/s) can be reserved for the short time when the retransmission request is inserted.

Furthermore, the bonding OAM insertion buffers and bonding OAM extract filters/buffers for ASM cells can be reused from the bonding sublayer.

Service Specific Retransmission

According to embodiments, the following services or classes of data may be distinguished to take a service specific retransmission into account.

A first class of data referred to as class A is related to delay sensitive services which need no retransmission such as VoIP, gaming application; service with low bandwidth; service should not be delayed by retransmission of other services.

A second class of data referred to as class B is related to high quality service such as IPTV. For theses services which are relaxed on delay retransmission is provided.

A third class of data which is referred to as class C is related to Best effort service such as WWW browsing, FTP download. These services are critical on delay and may not necessarily require retransmission.

Exemplary requirements for a service specific retransmission will be described below.

According to a first embodiment, retransmission is applied only for the high quality service and not for the other services. On top of the retransmission protected service, i.e. net data rate minus high quality service rate, all available line bandwidth (data transmission rate) can be used for forced insertion of retransmission data. According to embodiments, neither class B, C service data nor retransmission data of the high quality service shall delay the delay sensitive data of class A. In other words, Class A transmission is strictly prioritized over all other services and over retransmission.

Several embodiments can be implemented based on the above mentioned service specific retransmission.

According to a first embodiment, two latency paths may be used with one bearer channel assigned to each latency path. This would be the dual latency case since then one latency path (bearer channel) will be setup for high impulse noise protection and the other latency path (bearer channel) will be setup for delay sensitive data. But the delay sensitive service allocates always line bandwidth, also if this service is off.

Another embodiment which will be described in more detail with respect to FIGS. 10a and 10b includes the usage of one latency path with one bearer channel but 2 channels between the retransmission sublayer transmitter and the next higher sublayer and a strict priority multiplexer in the retransmission sublayer with delay sensitive service data from the next higher sublayer as first priority input, retransmission data from internal retransmission buffer as second priority input, other service data from the next higher sublayer as third priority input. In this case, no fixed line rate is allocated for the delay sensitive service and all available line bandwidth can be used for retransmission if the delay sensitive service is off.

Figure 10A:
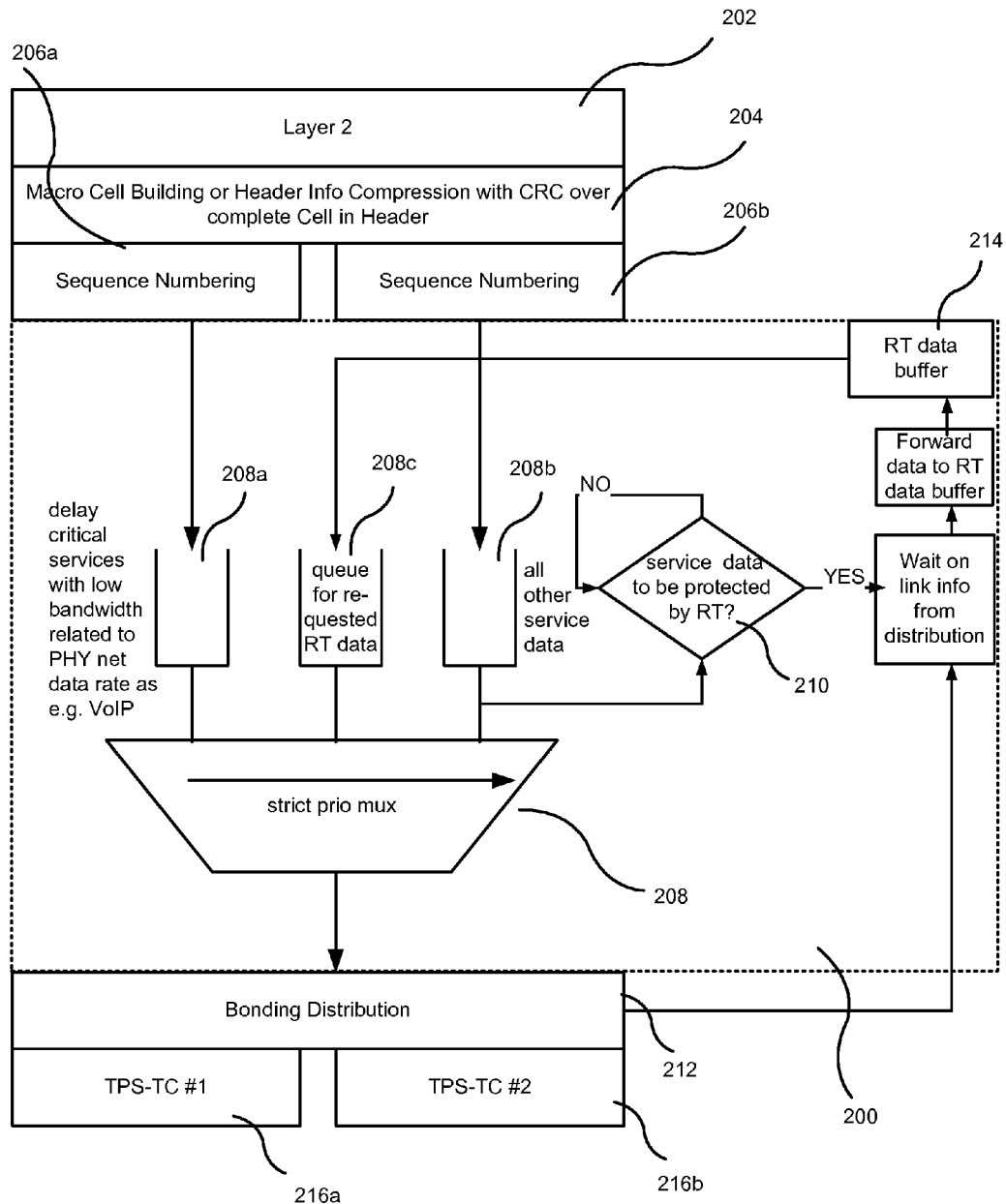
FIG. 10a shows a schematic embodiment of the present invention.

FIG. 10a shows a first implementation of a queuing block or queueing entity 200 located above the bonding distribution sublayer.

As can be seen in FIG. 10a, a data link entity 202 is coupled to a entity 204 provided to build a macro cell or provide header compression with a CRC over the complete cell for providing error detection functionality as described above. A first identification entity 206a (sequence numbering) associated with a first channel related to class A services and a second identification entity 206b associated with a second channel related to class B services are coupled to the entity 204. The first and second identification entities provide a sequence number for the plurality of cells or macro cells transferred to each identification entity.

A priority multiplexer 208 comprises a first queue 208a for class A services coupled to the first identification entity and a second queue 208b for class B and class C services coupled to the second identification entity 206b.

Data from cells/macro cells provided to the second queue are processed by a processor entity to determine whether a retransmission protection is needed for the data as indicated by reference number 210. If it is determined that the data is to be protected by retransmission, the data is transferred to a retransmission buffer 214 after receiving link information from a bonding distribution layer 212 to which the multiplexer 208 is coupled for distributing the received data cells/macro cells to communication links (subscriber lines) of the DSL system. The link information may for example include information whether impulse noise is currently present on one or both of the communication links.

The retransmission buffer 214 is coupled to a third queue 208c of the multiplexer 208 to retransmit the identified corrupt data cells/macrocells in case a retransmission is requested. As indicated in FIG. 4a, the three queues 208a, b and c are strictly prioritized such that data in queue 208a is prioritized over data in queue 208c and data in queue 208c is prioritized over data in queue 208b.

The cells/macrocells from the queues are multiplexed according to the above described priority scheme to the bonding entity 212. The bonding entity distributes the data among the bonded subscriber lines. Thus, cells/macrocells intended to be transmitted over a first subscriber lines are transferred to a first TPS-TC entity 216a associated with the first subscriber line and cells/macrocells transmitted over a second subscriber line are transferred to a second TPS-TC entity 216b associated with the second subscriber line.

While FIG. 10a shows only the TPS-TC layer, it is to be understood that for each of the subscribers lines layers and PMS-TC layer and PMD layers may be provided. It is to be noted that the basic data chunks for processing are the cells or macro cells as provided from entity 204.

Figure 10B:
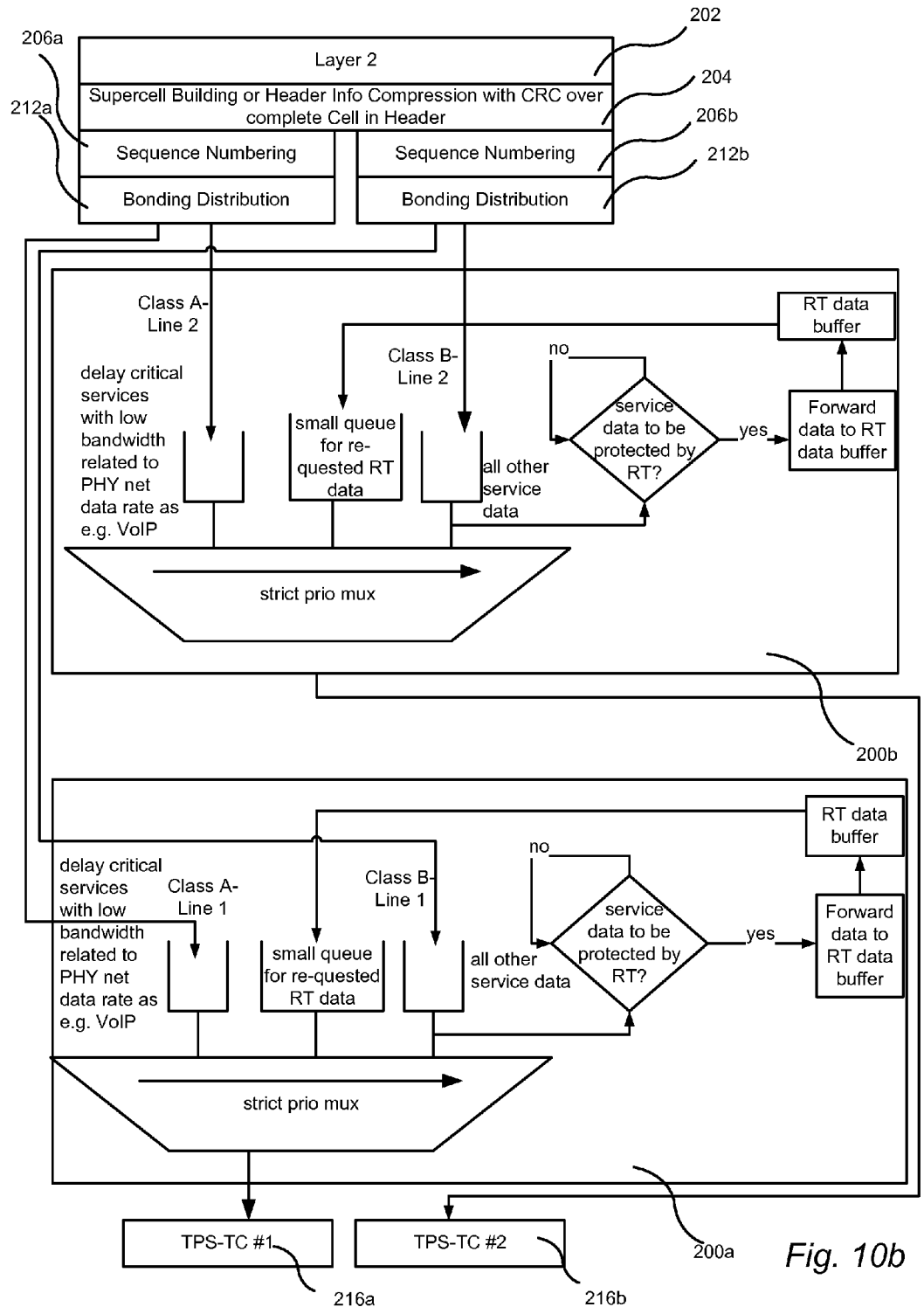
FIG. 10b shows a schematic embodiment of the present invention.

FIG. 10b shows a queuing if the queueing is located below the bonding distribution sublayer.

As shown in FIG. 10b, a first distribution entity 112a for distributing the priority class A cells/macro cells to the subscriber lines and a second distribution entity 112b for distributing the other cells/macro cells, i.e. the cells/macrocells with priority class B and C to the subscriber lines are coupled to the respective identification entities 206a and 206b.

For each subscriber line, a respective queueing entity 200a and 200b is provided similar to the queueing entity shown in FIG. 10a. However distinguished from FIG. 10a, since the queueing entity is provided for each subscriber line, transferring of line specific information is not required in the embodiment according to FIG. 10b. Each of the bonding distribution entities 206a and 206b has one output for distributing the respective cells/macro cells in accordance with the priority scheme to the respective queues.

According to the above, the queue 208b gets high quality service data as well as best effort service data so a differentiating factor is needed. A third channel between retransmission sublayer and the next higher sublayer may be implemented to provide separation of these data. This would require 3 interface addresses per DSL line if the next higher sublayer is located in a different device.

According to one embodiment, a dedicated bit in the cell/macro cell may be used to indicate the service to be protected by retransmission. This info bit should be transferred also in the cells/macro cells because the far-end retransmission sublayer receiver sees only one data stream. This sublayer queues the retransmission protected service data while waiting on retransmission data und does not queue other service data. This info is available in the layers above the here mentioned layers and this upper layer maps this information into a special ATM cell bit.

According to another embodiment, a service differentiation is done via three VPI/VCI connections, i.e. one for each service class. Class A service data should also not be delayed in the receiver due to a common reordering entity for all service data. Hence two sequence numbering and reordering entities should be used, one for class A service data and one for all other service data. For distinguishing between the two entities, one bit in the cell/macro cell header can be used. In other embodiments the VPI/VCI may be used if no common VPI/VCI for all service data is used.

Retransmission in the Layer Model

The following FIGS. 11a, 11b and 11c, 11d show two embodiments of arranging retransmission sublayer functions in a layer model.

Figure 11A:
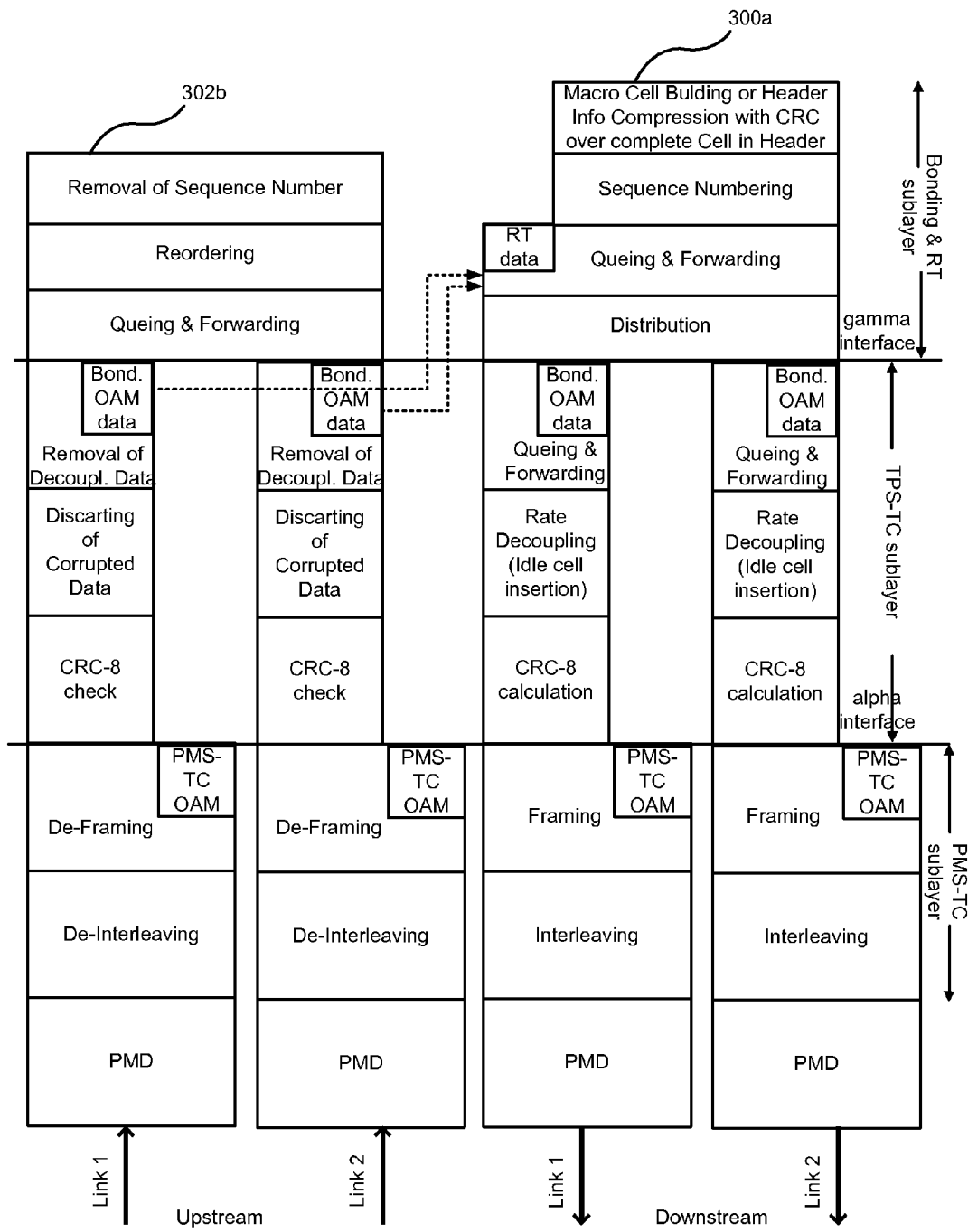
FIGS. 11a and 11b show a protocol stack according to an embodiment of the present invention.
Figure 11B:
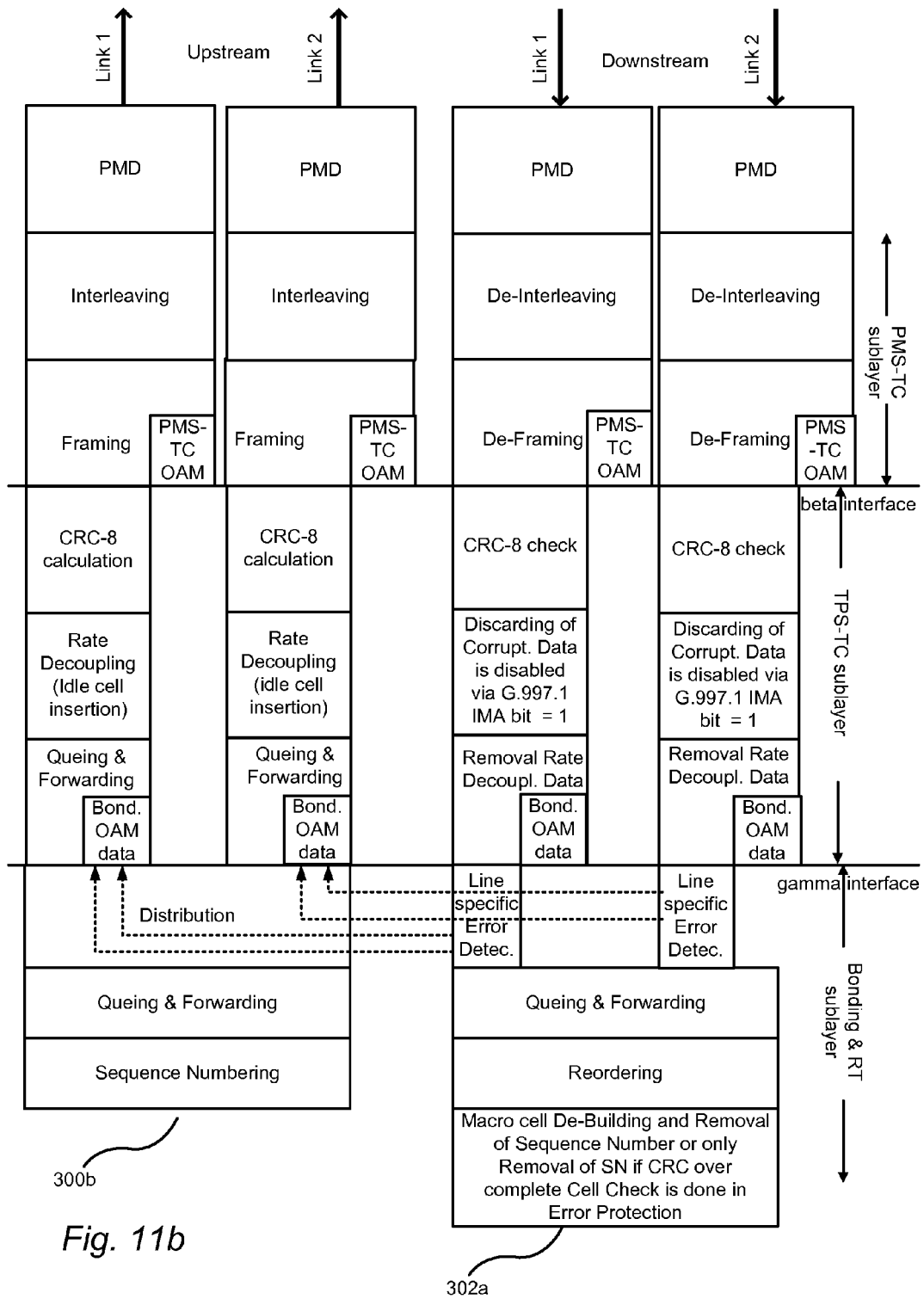

FIGS. 11a and 11b show an embodiment of a protocol stack for bonding with two links and retransmission for down-stream data where queueing and forwarding of the retransmission sublayer transmitter with insertion of retransmission data is located above the distribution of the bonding sublayer transmitter. According to this embodiment, line specific error detection is provided in the retransmission sublayer of the receiver. Furthermore, bonding OAM insertion function is used also for retransmission request insertion and a line specific retransmission request is transported over all bonded links.

In more detail, FIG. 11a shows a protocol stack for a receiver and transmitter at the Central Office site. FIG. 11b shows a protocol stack at the subscriber site (remote site). The protocol stack 300a of the receiver at the Central Office site comprises a bonding and retransmission sublayer between the TPS-TC layer (gamma interface) and the data link layer (not shown). The bonding and retransmission sublayer comprises an entity corresponding to entity 204 for building the macro cell or header information compression as describe above, an identification entity (sequence numbering) which may correspond to the identification entity 206, a queueing and forwarding entity and a distribution entity which may correspond to the bonding distribution entity 212. It is to be noted that the queueing and forwarding entity may correspond to the service dependent queueing entity 200 of FIG. 10a or may be a non-service dependent queuing entity.

In the TPS-TC sublayer, a queueing & forwarding entity with a bonding OAM entity for transmitting bonding information over an OAM channel is provided. Furthermore, the TPS-TC sublayer comprises a rate decoupling entity to provide idle cells and a CRC-8 entity as described above.

In the PMS-TC sublayer, a framing entity, an interleaving entity is provided together with a PMS-TC layer OAM entity to provide OAM channel communication at PMS-TC level. Finally a PMD sublayer as explained with respect to FIG. 1 is provided.

As can be shown in FIGS. 11a and 11b, each of the above described entities of the PMS-TC and TPS-TC sublayers are provided for each of the subscriber lines.

At the subscriber site, a protocol stack 302a having the reverse sequence of the protocol stack is provided in order to implement a receiver protocol stack. It is to be understood for a person skilled in the art that functionalities such as the interleaver framing and rate coupling are replaced at the receiver site by the complementary functionality.

Furthermore, it is to be understood that a transmitter protocol stack 300b similar to the protocol stack 300a may be implemented at the subscriber site. However, since the retransmission protection is only provided for downstream direction, no specific retransmission functionality is implemented at the protocol stack 300b.

As shown in FIG. 11b, an entity to enable discarding of corrupted data according to ITU-T G.997.1 is provided. Discarding of corrupted data is a specific functionality of the IMA (inverse multiplexing over ATM). By setting a dedicated bit (IMA bit), this functionality can be activated.

As can be seen in FIG. 11b, a line specific error detection entity is provided at the receiver protocol stack 302a of the subscriber site to detect corrupt received cells/macro cells. By using the identification provided by the identification entity at the Central Office site, the line specific error detection entity is capable of identifying the corrupt cells/macrocells as described above and transfers the identification information to the bonding OAM data entity of the transmitter protocol stack at the subscriber line. As can be seen in FIG. 11b, the information may be provided from the protocol stack for each of the subscriber lines to the OAM data entities of the transmitter protocol stacks for each subscriber line to allow transmitting of a retransmission request including the identification information over both subscriber lines back to the Central Office. This allows a more robust transmission of the retransmission request from the subscriber to the Central Office. At the Central Office, a receiver protocol stack 302b is implemented similar to the receiver protocol stack 302a. However, since in the described embodiment only downstream data, i.e. data transmitted from the Central Office to the subscriber, is retransmission protected, a line specific error detection is not implemented at the receiver protocol stack at the Central Office. At the Central Office, the retransmission request is processed by the bonding OAM entity. The bonding OAM entity transfers the identification information to the queueing and forwarding entity in the bonding and retransmission sublayer in order to start the retransmitting of the cells/macro cells which are identified as corruptly received.

Figure 11C:
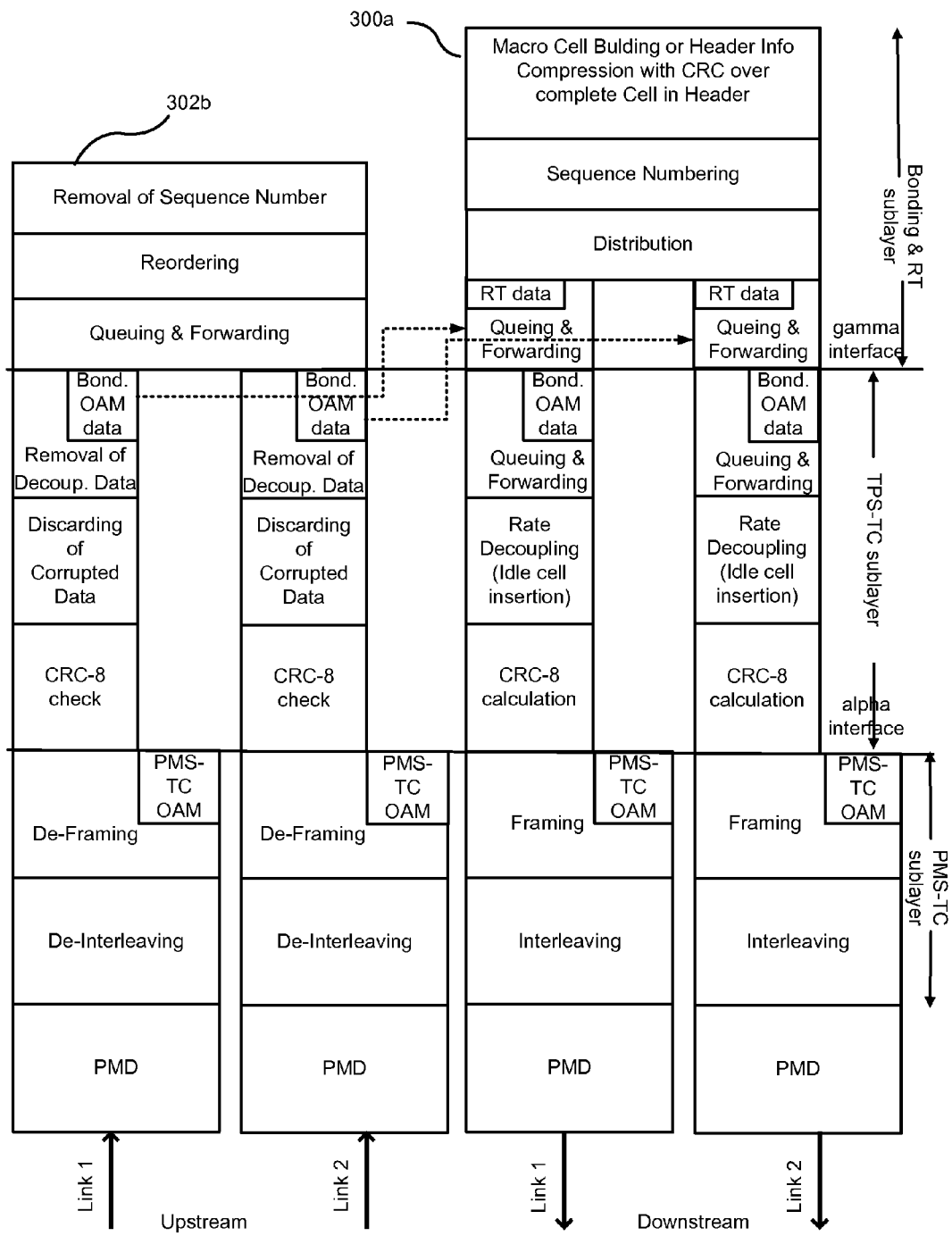
FIGS. 11c and 11d show a protocol stack according to an embodiment of the present invention.
Figure 11D:
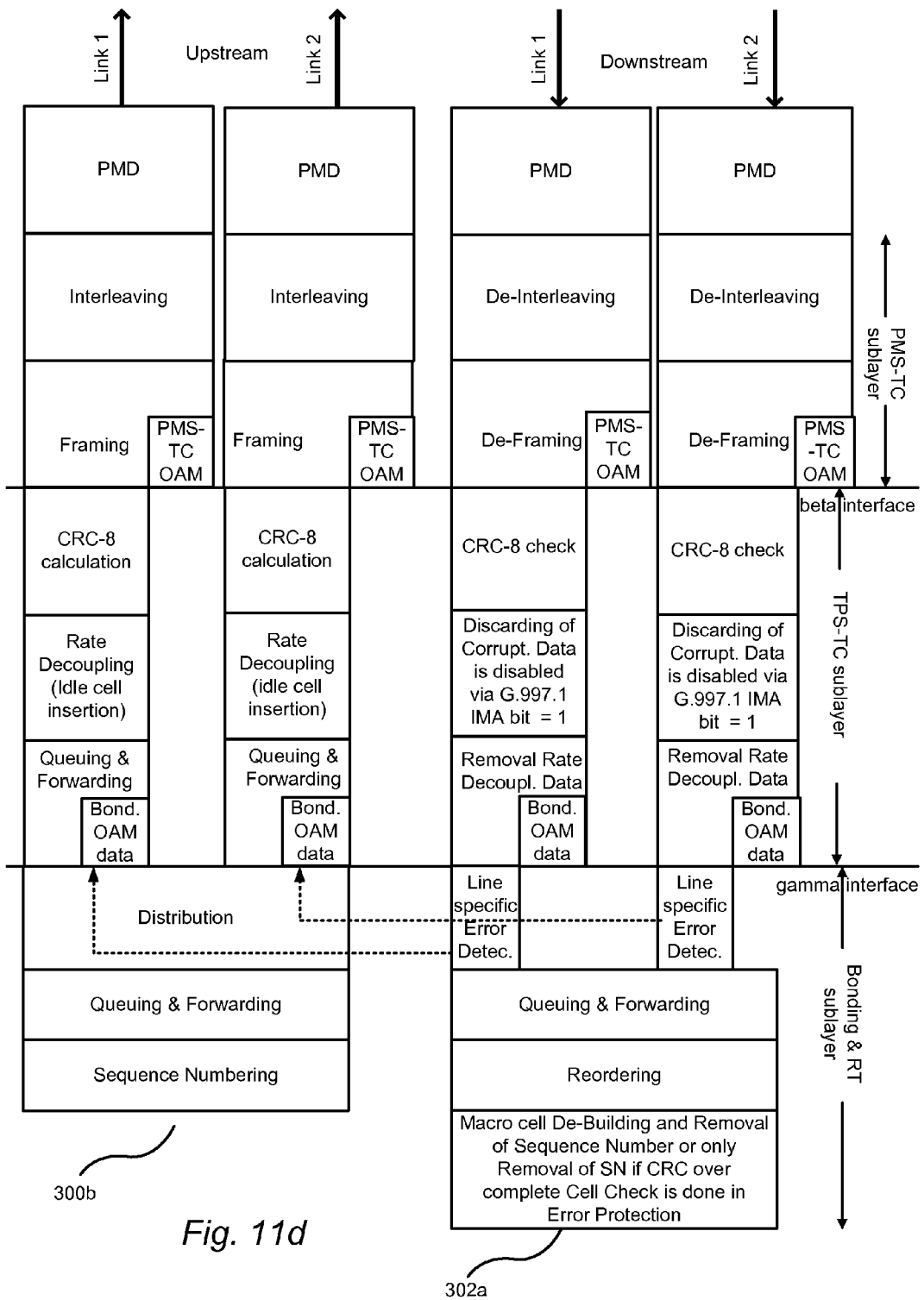

While FIGS. 11a and 11b show the queueing and forwarding functionality of the bonding and retransmission sublayer above the bonding distribution functionality, FIGS. 11c and 11d show an embodiment for bonding with two links and retransmission for downstream data wherein the queueing and forwarding of the retransmission sublayer transmitter with insertion of retransmission data is located below the distribution of the bonding sublayer transmitter. In this embodiment, a line specific retransmission request is transported over the effected line in opposite direction, i.e. a pure link specific retransmission scheme is implemented. Distinguished from the embodiment of FIGS. 11a and 11b, the retransmission request is only retransmitted over one of the subscriber lines, i.e. the retransmission request is transmitted over the same subscriber line on which the respective cells/macrocells have been transmitted.

It is further to be noticed that in the embodiment according to FIGS. 11c and 11d, since the queueing in the bonding and retransmission sublayer is implemented below the distribution functionality, a queueing entity is provided for each of the respective subscriber lines similar to the provision of queueing entities for each subscriber line in the embodiment described with respect to FIG. 10b.

Figure 12A:
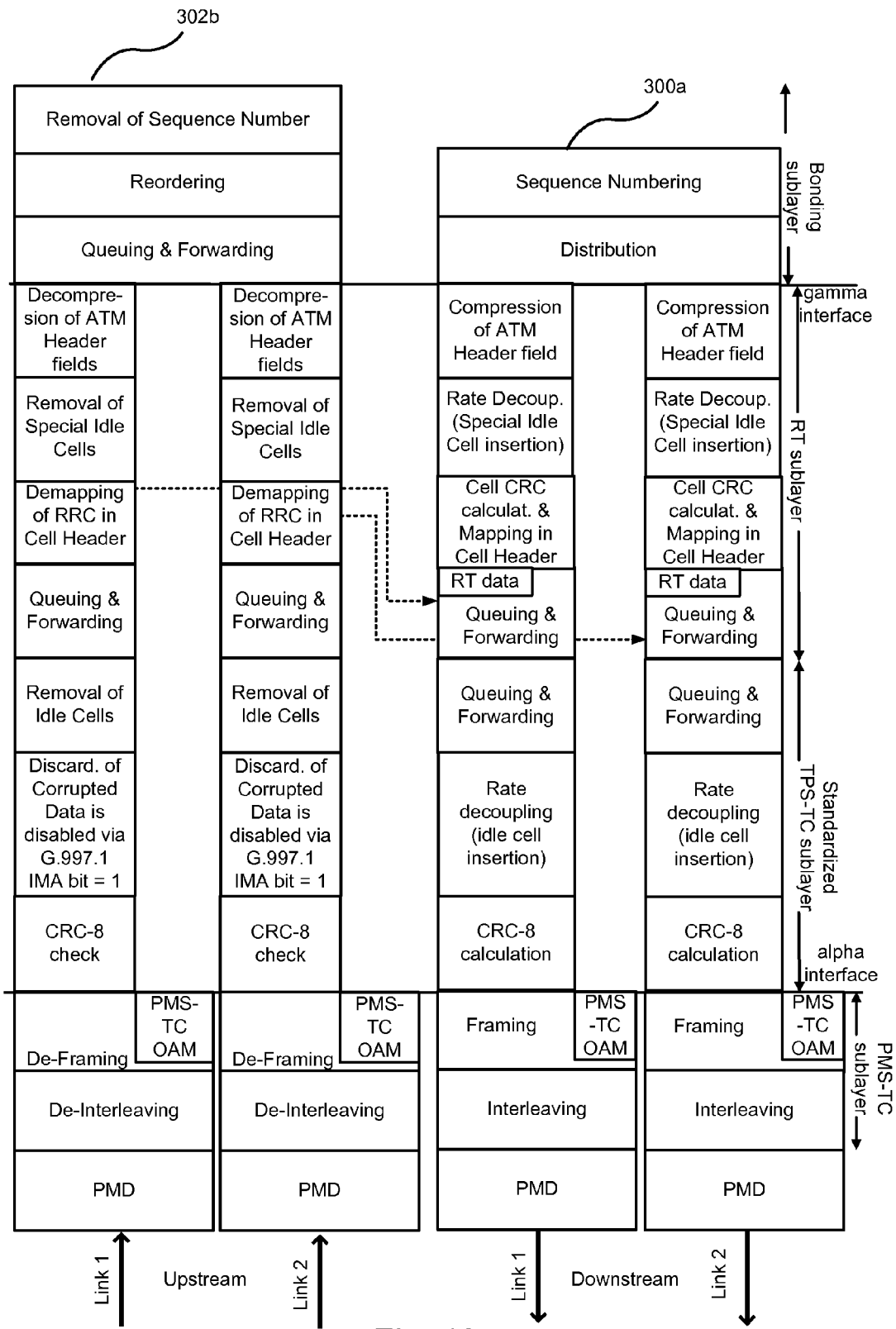
FIGS. 12a and 12b show a protocol stack according to an embodiment of the present invention.
Figure 12B:
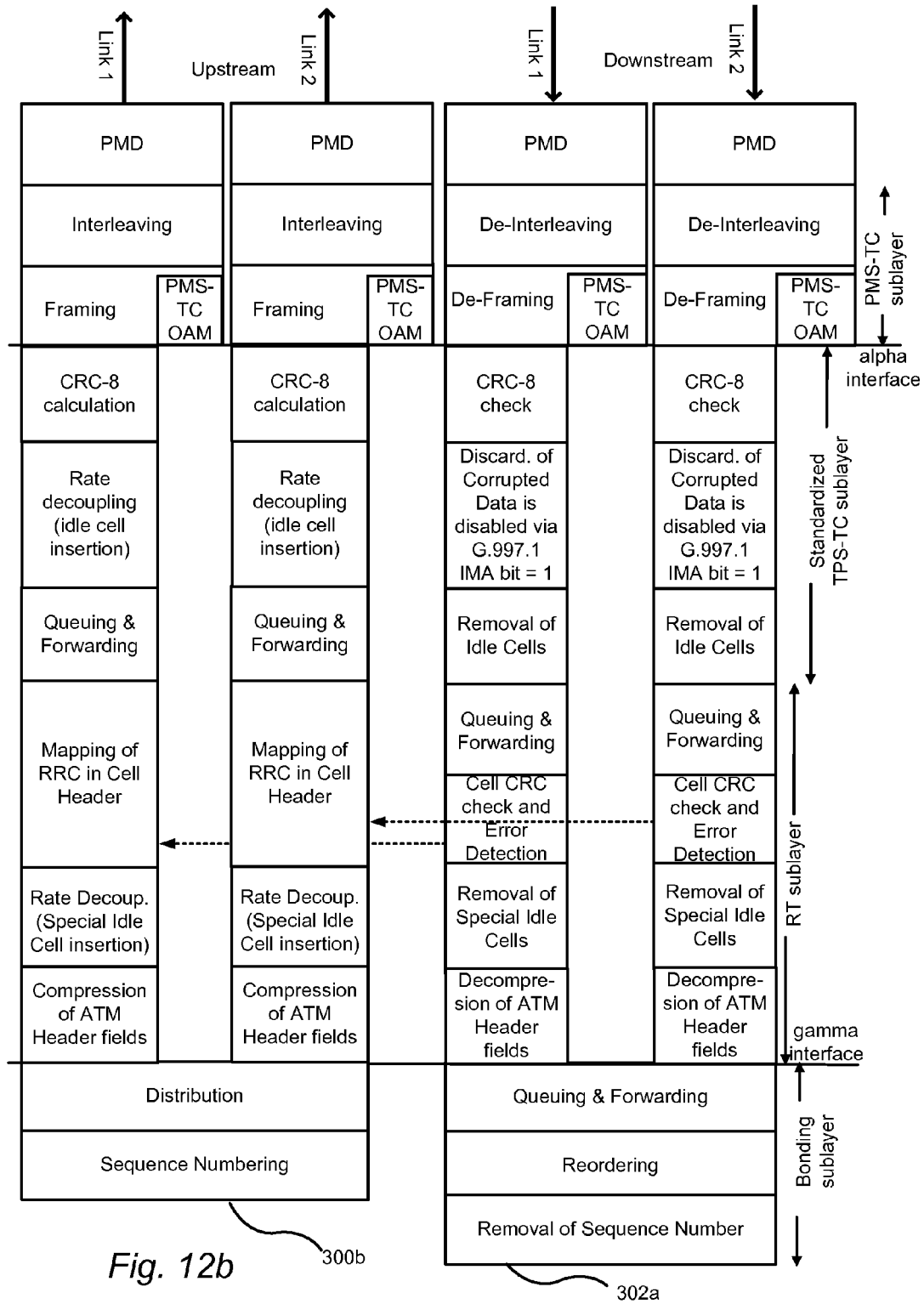

Referring now to FIG. 12, a further embodiment will be described wherein the bonding sublayer and the retransmission sublayer are separated. According to this embodiment, no changes may be provided in the bonding layer in order to implement the retransmission. Thus, conventional bonding layer implementations can be reused for implementing this embodiment without change.

According to embodiments, a rate decoupling is provided for the implementation of the separate bonding sublayer and retransmission sublayer. Since the rate decoupling is provided below the bonding sublayer, the idle cells are inserted/removed in a sublayer below the bonding sublayer. Therefore, the bonding sublayer is not capable of providing sequence information numbering for idle cells. In order to allow sequence number identification also for idle cells, a new category of idle cells is provided which are hereinafter referred to as special idle cells. These special idle cells are inserted and removed in the retransmission layer provided between a bonding layer and the TPS-TC layer as is for example shown in FIG. 4a. The special idle cells are not detected as idle cells by the TPS-TC layer at the far-end receiver such that the retransmission sublayer at the far-end can receive these special idle cells, identify them evaluate the information contained therein, for example the sequence number identification of the idle cell, and discard these special idle cells in order to prohibit the further transfer of the special idle cells to the bonding sublayer.

Identification of the special idle cell can be provided for example by using a reserved value of the compressed VPIVCI information such that if this reserved value is detected in the compressed VPIVCI field, the cell is identified as a special idle cell. However, any other form of identification such as a flag may be provided in the cell. It is to be noted that in one embodiment, the use of the special idle cells is provided in both directions. i.e. from the transmitter to the receiver (downstream) where the data are protected by retransmission and in the direction from the receiver to the transmitter (upstream) transmitting the request for retransmission. In the upstream direction, the use of the special idle cells allows a continuos provision of a retransmission request channel by the use of the special idle cells.

In upstream direction, an identification is provided in the special idle cells for identifying whether the cell transmits a request or not. For example, a special retransmission data value provided in the unused bit field of FIG. 5e may have the meaning that this idle cell is not requesting a start of noise impulse and that the bits contained in the unused bit field is not to be interpreted as a received SID information. This allows a continuous request channel wherein requests can be transmitted at any time independent whether user data are to be transmitted in upstream direction or not.

In case of bonded links and if the bonding SID is used also for retransmission, the SID increments consecutively on bonding group level but not on the link level. Therefore, the retransmission sublayer transmitter stores the link specific transmission sequence order of SIDs.

The transmitter gets from the far-end the information about the last valid received SID. It stops then the sending of the by-retransmission-to-be-protected data stream for the time of configured impulse noise length INPMIN. After this waiting time, it retransmits the data units of the to-be-protected data stream of this link which has been sent from LastValidSID+1 to the last sent SID when receiving the retransmission request. After insertion of retransmission data, the normal data stream can be continued.

For this retransmission principle, the retransmission sublayer transmitter is aware of line data at any point of time, i.e of the cells containing user datas as well as of the special idle cell. The sequence numbering is extended also to the "special idle cells" and included in the sequence numbering scheme. The additional needed cell header information space (one or more bits) can be provided by using free bits of the unused bits field due to VPI/VCI compression.

According to one embodiment, the special idle cells are used for training or determining one or more parameters of repetitive noise such as REIN (repetitive electrical impulse noise) parameters. The one or more parameters may then be used to determine time periods during which the repetitive noise is expected. During the determined time periods of the repetitive noise, no user data may be transmitted. According to one embodiment, instead of user data the special idle cells are transmitted during the determined time periods.

To determine the parameters of repetitive noise, a plurality of special idle cells are repeatedly transmitted from the transmitter to the receiver, wherein each of the special idle cells comprising a sequence number. One or more sequence numbers of corrupted special idle cells are identified at the receiver and one or more parameters of the repetitive noise based on the identified sequence numbers are determined. According to one embodiment, information related to a start and end of a repetitive impulse is transmitted from the receiver to the transmitter and the parameters of the repetitive noise are determined based on the transmitted information.

According to one embodiment, the retransmission sublayer at the transmitter site applies rate decoupling with special idle cells and the sequence numbering is extended to these special idle cells and the receiver informs the transmitter about the end of noise via a first valid received sequence numbering. Then, the transmitter can detect in the first seconds after link startup whether repetitive noise exists or not. The user data stream will be enabled in the higher layers a bit later after link startup so that in the first seconds after link startup, there will be only special idle cells on the line. In case of repetitive noise, the receiver will communicate a predetermined number of times, for example 100 times, a start of noise and end of noise message during the first second after link startup so that the transmitter can detect the periodicity and length of corrupted data. Due to this knowledge, the transmitter can from now on prevent that user data will be transmitted during the time of repetitive noise impulses via insertion of special idle cells which don't need to be retransmitted. According to one embodiment, this user data prevention may be adapted dynamically during showtime, e.g. every 5 seconds.

With the above described determining of repetitive noise parameters and preventing of transmission during expected repetitive noise periods, the retransmission scheme can be used for example when a combination of repetitive noise (for example repetitive noise impulses of up to 5 symbols every 10 ms) and non-repetitive noise such as noise impulses with long impulse width (of up to 64 symbols) with a long time distance between the noise impulses occurs. The above embodiment of preventing transmission of user data by transmitting the special idle cells allows an efficient retransmission with a predetermined retransmission waiting time (minimum number of symbols the transmitters waits until retransmitting the data) longer than a period of the repetitive noise.

For the embodiment of separated bonding sublayer and retransmission sublayer, the same data stream specific retransmission with different classes as described above can be used. In particular, It can be differentiated between following data streams:

1) Class B: High quality service; retransmission needed (IPTV; delay not very critical)
2) Class A: Delay Sensitive Service; No Retransmission needed (VoIP, gaming application; service with low band-width; service should not be delayed by retransmission of other services)
3) Class C: best effort service; no retransmission needed (WWW browsing, FTP download; delay not critical).

The requirements for a data stream specific retransmission may be as follow:
   i) Apply retransmission only for the high quality service and not for the other services
   ii) All available line bandwidth on top of the retransmission protected service, i.e. net data rate minus high quality service rate, to be used for forced insertion of retransmission data,
   iii) But retransmission data of the high quality service shall not delay the delay sensitive data.

According to one embodiment, one latency path may be used with one bearer channel but 2 channels between the retransmission sublayer transmitter and the next higher sublayer and a strict priority multiplexer in the retransmission sublayer with delay sensitive service data from the next higher sublayer as first priority input, retransmission data from internal retransmission buffer as second priority input, other service data from the next higher sublayer as third priority input. No fixed line rate is allocated for the delay sensitive service and iii) can be fulfilled if the delay sensitive service is off. The third priority input gets high quality service data as well as best effort service data so a differentiating factor is needed.

The data stream classification may be provided via different VPI/VCI values. The relationship between VPI/VCI and data stream class is communicated from the upper layers to layer 1 before the user traffic is permitted.

One embodiment of a layer model of the above described retransmission scheme with separated bonding and retransmission sublayer is shown in FIG. 12. As can be seen the bonding layer provides sequence number and distribution functionality for the user data is provided above the retransmission sublayer. The retransmission sublayer includes a compression of ATM header fields as described above. Furthermore, rate decoupling is provided wherein the special idle cells are inserted in the transmitter protocols stacks 300a and 300b or are removed in the receiver protocol stacks 302a and 302b. A cell CRC calculation and a mapping of the calculated CRC check sum in the cell header is further provided in the retransmission sublayers. It is to be noted that at the protocol stack 302a of the receiver at the subscriber site, a removal of idle cells is provided in the TPS-TC layer. However, this functionality does not remove the special idle cells which are transferred to the retransmission sublayer and are only removed after the CRC check and error detection and identifying of the sequence number of a corrupt idle cell. After a corrupt cell or a corrupt special idle cell has been detected, the sequence number of the last valid cell is mapped in the cell header (for example in the unused bits field) at the transmitter protocol stack 300b and transmitted to the receiver at the Central Office site. The protocol stack at the Central Office site demapps the sequence number in the cell header and provides this information to the RT sublayer of the transmitter protocol stack 300a at the CO site to start retransmission. It is to be noted that retransmission may start after waiting a predetermined time period as described above.

While the above describes embodiments with a bonding sublayer, it is to be noted that in other embodiments the functionalities of the bonding sublayer such as sequence numbering and distribution can be included in the retransmission sublayer without providing the bonding sublayer.

In the above description, embodiments have been shown and described herein enabling those skilled in the art in sufficient detail to practice the teachings disclosed herein. Other embodiments may be utilized and derived there from, such that structural and logical substitutions and changes may be made without departing from the scope of this disclosure.

This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. It is further to be understood that the various methods disclosed in this specification and the claims can be implemented in devices having means or circuit components configured to enable the corresponding method steps.

It is further to be noted that specific terms used in the description and claims may be interpreted in a very broad sense. For example, the terms "circuit" or "circuitry" used herein are to be interpreted in a sense not only including hardware but also software, firmware or any combinations thereof. The term "data" may be interpreted to include any form of representation such as an analog signal representation, a digital signal representation, a modulation onto carrier signals etc. Furthermore the terms "coupled" or "connected" may be interpreted in a broad sense not only covering direct but also indirect coupling.

The accompanying drawings that form a part hereof show by way of illustration, and not of limitation, specific embodiments in which the subject matter may be practiced.

What is claimed is:

1. A method comprising
receiving a plurality of cells;
providing for each cell or a group of the plurality of cells an identification;
transmitting the plurality of cells from a first transceiver unit to a second transceiver unit;
transmitting a request for retransmission from the second transceiver unit to the first transceiver unit, the request comprising one or more identifications to indicate a retransmission request for one or more cells;
providing a cell header compression, the cell header compression reducing a cell header by n bits;
subsequent the cell header compression, using at least a part of the n bits for providing CRC information, without reduction of header bytes, the CRC information used to verify an integrity of at least one of the plurality of cells;
processing the request for retransmission at the first transceiver unit to identify the cells for retransmission based on the identification; and
retransmitting the one or more identified cells.

2. The method according to claim 1, wherein providing an identification comprises providing for each of the plurality of cells an identification.

3. The method according to claim 1, wherein providing an identification for a group of cells comprises: grouping a plurality of cells to provide a macro cell; and providing an identification for the macro cell.

4. The method according to claim 1, further comprising: identifying the one or more cells to be retransmitted based on a FEC processing or a CRC processing or a HEC processing or any combinations of a FEC, CRC and HEC processing.

5. The method according to claim 4, wherein the CRC processing comprises a CRC calculation over each complete cell or a CRC calculation over each complete group of cells.

6. The method according to claim 1, further comprising: multiplexing a first stream of cells associated with at least a first service type, a second stream of cells associated with at least a second service type and a third stream of cells associated with retransmission data.

7. The method according to claim 1, further comprising: determining whether the one or more identified cells includes an idle cell; and in case an idle cell has been determined, discarding retransmission of the idle cell.

8. The method according to claim 1, further comprising: determining one or more repetitive noise parameters, the one or more repetitive noise parameters determining time periods during which no user data is transmitted.

9. The method according to claim 8 further comprising: based on the determining of one or more repetitive noise parameters, determining one or more cells which are expected to be disturbed by a noise impulse; and immediately starting a retransmission for all determined cells.

10. The method according to claim 1, further comprising: determining whether a received cell is corrupt; if at least one cell is determined to be corrupt, determining the identification of the last correctly received cell; including the identification of the last correctly received cell into the request for retransmission.

11. The method according to claim 1, wherein the providing of an identification and the processing of the request for retransmission is provided hierarchically between a PMS-TC layer and a data link layer.

12. The method according to claim 1, further comprising: transmitting idle cells from the first transceiver to the second transceiver, the idle cells being transparent to the TPS-TC layer of the first and second transceiver.

13. The method according to claim 1, further comprising: determining a service class associated with a cell or the group of cells; and determining whether a retransmission request is to be provided for the cell based on the determined service class.

14. The method according to claim 1, further comprising: distributing the plurality of cells to a plurality of subscriber lines based on the identification, thereby providing a bonding of the first and second subscriber line.

15. A transmitter comprising:
an input to receive a plurality of cells;
an identification entity to provide for each of the plurality of cells or for a group of the plurality of cells an identification;
a transmit entity to initiate transmission of the plurality of cells to a remote transceiver unit;
a retransmission entity to receive a retransmission request of at least one of the plurality of cells, the request including at least one identification from the remote transceiver unit, the retransmission entity being configured to transfer to the transmit entity one or more cells based on the received at least one identification; and
an entity to provide a cell header compression, the cell header compression reducing a cell header by n bits, and subsequent the cell header compression, to use at least a part of the n bits for providing CRC information, without reduction of header bytes, the CRC information used to verify an integrity of at least one of the plurality of cells,
wherein at least one of the entities is at least partially embodied in hardware.

16. The transmitter according to claim 15, wherein the receiver further comprises a bonding entity to bond a plurality of communication links.

17. The transmitter according to claim 15, wherein the bonding entity shares at least one functionality with the retransmission entity.

18. The transmitter according to claim 15, further comprising a multiplexer to multiplex a first stream of cells associated with at least a first service type, a second stream of cells associated with at least a second service type and a third stream of cells associated with retransmission data.

19. The transmitter according to claim 15, further comprising a CRC entity to provide CRC calculations over each whole cell or over each whole group of cells.

20. The transmitter according to claim 15, wherein the retransmission entity is implemented hierarchically between a PMS-TC layer and a data link layer.

21. The transmitter according to claim 15, further comprising a TPS-TC entity to provide processing of at least one TPS-TC functionality for the cells, the TPS-TC entity being configured to receive the plurality of cells from the retransmission entity.

22. A receiver comprising:
an input to receive a plurality of cells;
an identification entity to provide for each of the plurality of cells or for a group of the plurality of cells an identification;
a transmit entity to initiate transmission of the plurality of cells to a remote transceiver unit;
a retransmission entity to receive a plurality of cells from a remote transmitter and to provide an indication of at least one corrupt cell or an indication of at least one corrupt group of cells;
a request generation entity to receive the indication and to generate a retransmission request based on the indication; and
an entity to provide a cell header compression, the cell header compression reducing a cell header by n bits, the entity to further, subsequent to the cell header compression and without reduction of header bytes, use at least a part of the n bits for providing CRC information, the CRC information used to verify an integrity of at least one of the plurality of cells,
wherein at least one of the entities is at least partially embodied in hardware.

23. The receiver according to claim 22, further comprising: a TPS-TC entity to provide processing for at least one TPS-TC functionality for the received cells, wherein the receiver is configured to transfer the plurality of cells from the TPS-TC entity to the retransmission entity.

24. The receiver according to claim 22, further comprising a CRC entity, the CRC entity providing an error detection, wherein the retransmission entity provides indication of a corrupt cell based on a result of the CRC entity.

25. The receiver according to claim 22, wherein the CRC entity is capable of providing error detection for a whole cell or a whole group of cells.

26. The receiver according to claim 22, wherein the receiver further comprises a bonding entity to bond a plurality of communication links.

27. The receiver according to claim 26 wherein the bonding and the retransmission entity share a same identification of cells or group of cells.

28. The receiver according to claim 26, wherein the bonding entity and the retransmission entity are implemented on a same protocol sublayer.

29. The receiver according to claim 26, wherein the bonding entity is implemented in a sublayer between a TPS-TC sublayer and the data link layer.

30. The receiver according to claim 22, wherein the request generation entity is configured to provide an indication of a last correctly received cell or an indication of a last correctly received group of cell in the retransmission request.

31. The receiver according to claim 22, wherein the request generation entity is configured to determine a service class associated with a corrupt received cell or a corrupt received group of cell and to determine whether a retransmission request should be generated based on the determined service class.

32. A DSL transmission system comprising:
- a first transceiver unit, the first transceiver unit comprising an input to receive a plurality of cells; an identification entity to provide an identification for each of the plurality of cells or for a group of cells;
- an entity to provide a cell header compression, the cell header compression reducing a cell header by n bits, the entity to further, subsequent to the cell header compression and without reduction of header bytes, use at least a part of the n bits for providing CRC information, the CRC information used to verify an integrity of at least one of the plurality of cells; and
- a retransmission entity to receive a retransmission request including at least one identification from the remote transceiver unit, the retransmission entity being configured to transfer to the transmit entity one or more cells based on the received at least one identification;
- a second transceiver unit, the second transceiver unit comprising a second retransmission entity to receive the plurality of cells and to provide indication of at least one corrupt cell or at least one corrupt group of cells;
- a request generation entity to receive the indication and to generate the retransmission request based on the indication,
- wherein at least one of the entities and units is at least partially embodied in hardware.

* * * * *